United States Patent
Kawano

(10) Patent No.: US 8,107,520 B2
(45) Date of Patent: Jan. 31, 2012

(54) WIRELESS COMMUNICATION APPARATUS HAVING EQUALIZER

(75) Inventor: Takahiro Kawano, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 1076 days.

(21) Appl. No.: 11/979,797

(22) Filed: Nov. 8, 2007

(65) Prior Publication Data

US 2008/0112478 A1    May 15, 2008

(30) Foreign Application Priority Data

Nov. 15, 2006   (JP) .................. 2006-308531

(51) Int. Cl.
*H03H 7/30*   (2006.01)

(52) U.S. Cl. ........ 375/230; 375/233; 375/260; 375/150; 370/208; 370/210; 370/338; 370/480

(58) Field of Classification Search .............. 375/230, 375/233, 260, 150; 370/208, 260, 210, 338, 370/480

See application file for complete search history.

(56) References Cited

U.S. PATENT DOCUMENTS

| | | | |
|---|---|---|---|
| 7,340,218 B2* | 3/2008 | Shoulders et al. | 455/67.11 |
| 2007/0230594 A1* | 10/2007 | Mo et al. | 375/260 |
| 2008/0031310 A1* | 2/2008 | Feher | 375/150 |
| 2008/0095226 A1* | 4/2008 | Bar-Ness et al. | 375/233 |
| 2010/0061223 A1* | 3/2010 | Kim et al. | 370/208 |

FOREIGN PATENT DOCUMENTS

| | | |
|---|---|---|
| JP | 2002-344411 A | 11/2002 |
| JP | 2003-152672 A | 5/2003 |
| JP | 2005-223575 A | 8/2005 |
| JP | 2006-101019 | 4/2006 |

OTHER PUBLICATIONS

"IDG Information Communication Series 802.11 High Speed Wireless LAN Textbook" supervised by Hideaki Matsue and Masahiro Morikura, IDG Japan Co., Ltd., pp. 192-193.

"Standard ECMA-368 1st Edition -Dec. 2005, High Rate Ultra Wideband PHY and MAC Standard", [online], [searched on Oct. 26, 2006], Internet http://www.ecma-international.org/publications/files/ECMA-ST/ECMA-368.pdf,pp. 19-23.

Japanese Office Action dated Aug. 23, 2011 with an English translation.

* cited by examiner

*Primary Examiner* — Eva Puente

(74) *Attorney, Agent, or Firm* — McGinn IP Law Group, PLLC

(57) ABSTRACT

Receiving a transmission line estimation sequence, a wireless communication apparatus generates a transmission line characteristic estimation value for each of a plurality of sub-carriers and smoothes the transmission line characteristic estimation value of a target sub-carrier to be processed and the transmission line characteristic estimation value of its adjacent sub-carrier. The apparatus includes a determination unit for determining whether or not the adjacent sub-carrier, is a null sub-carrier and a smoothing unit for smoothing the transmission line characteristic estimation value of the target sub-carrier by excluding the transmission line characteristic estimation value of the adjacent sub-carrier determined as a null carrier by the determination unit.

10 Claims, 17 Drawing Sheets

| k VALUES | -64 | -63 | -62 | -61 | -60 | -59 | ... | 62 | 63 |
|---|---|---|---|---|---|---|---|---|---|
| NL(k) | 0 | 0 | 1 | 1 | 1 | 0 | ... | 0 | 0 |

WIRELESS COMMUNICATION APPARATUS HAVING EQUALIZER

BACKGROUND OF THE INVENTION

1. Field of the Invention

The present invention relates to an equalizer of a wireless communication apparatus, more particularly to an equalizer of a wireless communication apparatus for estimating transmission line characteristics by using a transmission line estimation sequence, which is a symbol for estimating transmission line characteristic of each sub-carrier.

2. Description of Related Art

A transmission line estimation error has often occurred conventionally on a condition that combines two functions; one of the functions is an interference avoiding function for avoiding interferences with other wireless communication devices and the other function is a transmission line equalizing function that uses an equalizer for reducing degradation of characteristics to occur due to a fading process. The problem has been specific to wireless communication systems. Hereunder, there will be described such interferences with other wireless communications and the fading process.

In the case of the UWB (Ultra Wide Band) wireless communication that uses the OFDM (Orthogonal Frequency Division Multiplex) method, wide band frequencies of 3.1 GHz to 10.6 GHz are used. Thus the UWB communication often causes a problem of interferences with other wireless communication devices that use those bands. To avoid such a problem, a UWB wireless communication device is provided with an interference avoiding function for detecting frequency bands used by other wireless communication devices and avoiding using those frequency bands and using another frequency band for communications. Concretely, such interferences are avoided with use of a method that belongs to the OFDM communication method characterized in that transmission data is divided into a plurality of carrier waves (hereinafter, to be referred to as "sub-carriers"), then the divided data is sent out.

FIG. 22 shows an explanatory diagram of a spectrum of transmission data while communication interferences are avoided. In the descriptions to be made below, it is premised that a sub-carrier number k and a frequency shown on the horizontal axis are proportional to each other and the 0-th sub-carrier denotes DC components while the vertical axis denotes a power with respect to the subject spectrum. In case where a UWB wireless communication machine detects that other wireless communications use frequency bands corresponding to the sub-carrier numbers 4, 5, and 6 shown in FIG. 22, the UWB wireless communication machine avoids sending sub-carriers of the frequencies corresponding to the sub-carrier numbers 4, 5, and 6 as shown in FIG. 22, that is, avoids assignment of data, thereby avoiding causing of interferences with other wireless communications in the UWB communication and enables both UWB wireless communication machine and other wireless communication machines to be used simultaneously. Hereinafter, avoiding sending of a predetermined frequency sub-carrier will be referred to as "tone nulling".

As a general problem of wireless communications, there is degradation of communication characteristics to be caused by fading. "Fading" means a phenomenon in which a mutual interference occurs between signals received with different delay times, since the receiver receives signals obtained by synthesizing waves from transmitters with different delay times generated according to various transmission lines. In order to solve this problem, generally, an equalizer provided in the subject receiver estimates frequency characteristics of the transmission line between the transmitter and the receiver (hereinafter, to be referred to as the "transmission line estimation") and multiplies the received signal by a coefficient obtained through the transmission line estimation (hereinafter, to be referred to as the "transmission line correction coefficient") to execute the equalization processing. Furthermore, because the signal received by the receiver includes noise, an error occurs in the transmission line estimation.

In order to reduce the transmission line estimation error caused by this noise, the equalizer uses a filter for smoothing transmission line characteristics estimation values. Hereinafter, such a filter for smoothing transmission line characteristics estimation values will be referred to as a "frequency direction filter". Patent document 1 discloses a technique for reducing degradation of accuracy for interpolating transmission line characteristics obtained with a pilot signal in the frequency axial direction. On the other hand, the non-patent document 1 discloses a frequency direction filter for reducing the transmission line estimation error. Non-patent document 2 describes details of frame configurations of signals to send and receive.

[Patent Document 1] Japanese Unexamined Patent Application Publication No. 2006-1010119

[Non-patent Document 1] "IDG Information Communication Series 802.11 High Speed Wireless LAN Textbook" supervised by Hideaki Matsue and Masahiro Morikura, IDG Japan Co., Ltd., pp. 192-193

[Non-patent Document 2] "Standard ECMA-368 $1^{st}$ Edition—December 2005, High Rate Ultra Wideband PHY and MAC Standard", [online], [searched on Oct. 26, 2006], Internet http://www.ecma-international.org/publications/files/ECMA-ST/ECMA-368.pdf, pp. 19-23

However, if smoothing is executed for a tone-nulled sub-carrier in the frequency direction filter, the transmission line estimation error between a tone nulled sub-carrier and its adjacent sub-carrier increases, thereby resulting in degradation of the PER (Packet Error Rate, a possibility of wrong data modulation to occur in a receiver). As a result, a required CNR (Carrier to Noise Ratio), for example, a CNR value at which the PER becomes 8% or under increases. Here, the "CNR" denotes a ratio between a carrier wave and a noise power. This denotes that the larger the CNR value becomes, the less the noise becomes. An increase of the required CNR and an increase of the carrier wave power required for noise are proportional to each other. Consequently, in order to increase the power of a carrier received by a receiver, it is required to shorten the distance between the transmitter and the receiver. If the transmission line estimation error increases in such a way, the required CNR also increases, thereby the communication distance is shortened. This has been a problem.

SUMMARY OF THE INVENTION

The wireless communication apparatus of the present invention receives a transmission line estimation sequence, generates a transmission line characteristics estimation value for each of a plurality of sub-carriers, and smoothing the transmission line characteristics estimation value of a target sub-carrier to be processed and the transmission line characteristics estimation value of its adjacent sub-carrier. The apparatus includes a determination unit for determining whether or not the adjacent sub-carrier is a null sub-carrier and a smoothing unit (e.g., any of switching units 301 and 302, as well as an adder 256 shown in FIG. 11) for smoothing the transmission line characteristics estimation value of the target sub-carrier by excluding the transmission line characteristics estimation value of the adjacent sub-carrier determined as a null sub-carrier by the determination unit.

In such a way, the wireless communication apparatus suppresses the transmission line estimation error by executing substitution of transmission line characteristics estimation values when the target sub-carrier is assigned no data or its transmission line characteristics are degraded due to a fading process if a transmission line characteristics estimation value between adjacent sub-carriers is under a predetermined threshold value.

According to the present invention, therefore, it is possible to the reduce transmission line estimation error. Consequently, it is also possible to reduce the required CNR, thereby extending the communication distance between the transmitter and the receiver.

BRIEF DESCRIPTION OF THE DRAWINGS

The above and other aspects, advantages and features of the present invention will be more apparent from the following description of certain exemplary embodiments taken in conjunction with the accompanying drawings, in which.

DETAILED DESCRIPTION OF THE EXEMPLARY EMBODIMENT

Figure 1:
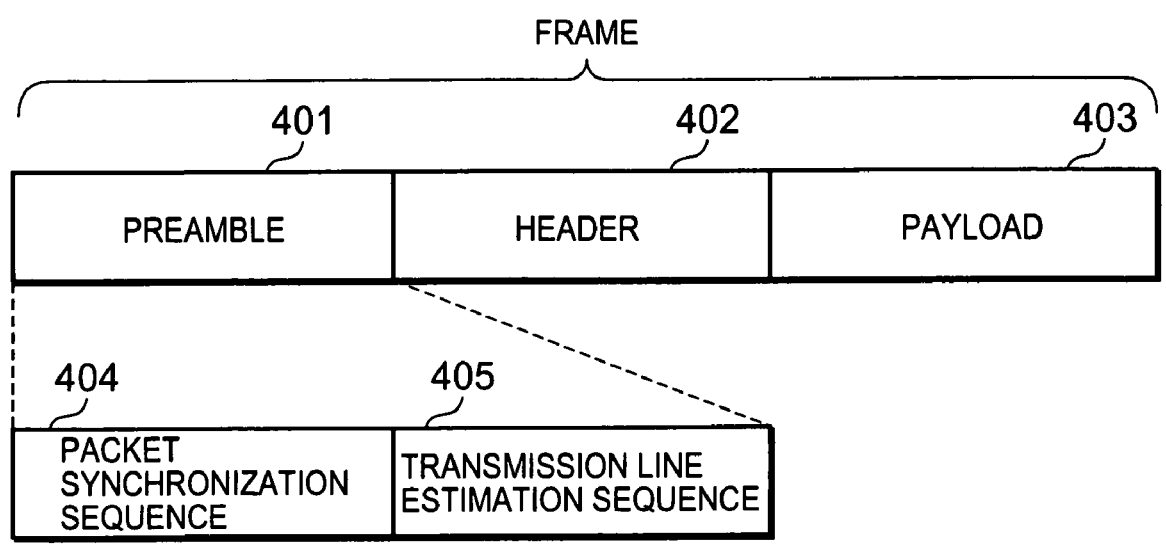
FIG. 1 is a configuration diagram for showing an example of a frame used for UWB wireless communications.

Next, there will be described the embodiments of the present invention with reference to the accompanying drawings. In those drawings, same reference numerals will be used for components having same configurations and same functions, avoiding redundant description. In this specification, if any component has a plurality of different configurations or functions while the component has only one name, a suffix will be added to each of its reference numerals to distinguish between or among those configurations or functions. For example, in the following description, there are reference numerals 204a to 204d, as well as 204p used for a frequency direction filter 204. In this case, unless otherwise specially described, the frequency direction filter 204 is assumed to denote any one of those filters 204a to 204d and 204p or a plurality of frequency direction filters collectively. The frequency direction filter 204a (or when a suffix is added to its reference numeral like 204p), the plurality of frequency direction filters are distinguished individually.

Before describing the embodiments of the present invention, there will be described general UWB communications that use the OFDM method. At first, there will be described a frame configuration of signals to be sent and received in the UWB communication by using the OFDM method with reference to FIG. 1. The frame shown in FIG. 1 consists of items of preamble 401, header 402, payload 403. The preamble 401 consists of a packet synchronization sequence 404 for 24 OFDM symbols used in a synchronization processing unit 18 (FIG. 2) to be described later and a transmission line estimation sequence 405 for an OFDM symbol used to estimate transmission line characteristics of each sub-carrier. The header 402 includes information such as rate information of its succeeding payload 403, a data length, etc. The payload 403 is data itself to be handled in the UWB wireless communication.

Figure 2:
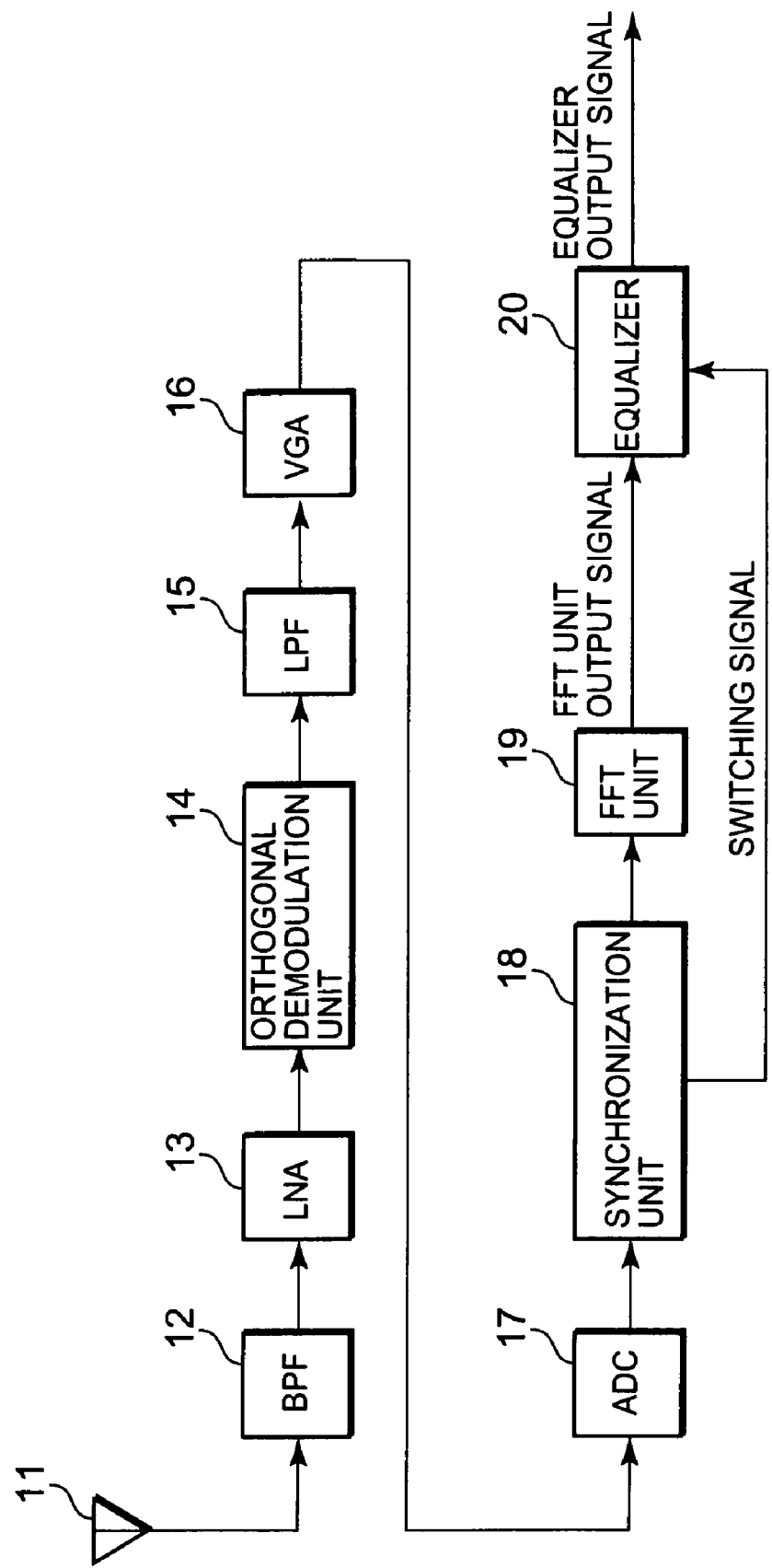
FIG. 2 is a block diagram for showing a configuration example of a receiver used for the UWB wireless communications.

Next, there will be described an example of a receiver used for the UWB wireless communication according to the OFDM method with reference to FIG. 2. The receiver shown in FIG. 2 includes an antenna 11, a band-path filter (BPF) 12, a low noise amplifier (LNA) 13, an orthogonal demodulation unit 14, a low-path filter (LPF) 15, a variable gain amplifier (VGA) 16, an A/D (Analog/Digital) converter (ADC) 17, a synchronization processing unit 18, an FFT (Fast Fourier Transform) unit 19, and an equalizer 20.

Next, there will be described briefly how a receiver that uses the OFDM method receives data with reference to FIG. 2. The band of a signal received by the antenna 11 is selected by the BPF 12, then the signal is amplified by the LNA 13. The BPF 12 is a filter for selecting a frequency band to be received by the receiver from among frequency bands used in the UWB communication. The LNA 13 amplifies the signal of the frequency band selected by the BPF 12 and the orthogonal demodulation unit 14 demodulates the signal amplified by the LNA 13 orthogonally.

The LPF 15 removes high frequency components from the base band signal demodulated by the orthogonal demodulation unit 14 and the VGA 16 amplifies the baseband signal from which high frequency components are removed by the LPF 15 up to a predetermined signal level. The ADC 17 inputs the baseband signal amplified by the VGA 16 and samples and quantizes the signal, then outputs the digitalized discrete baseband signal. The output signal of the ADC 17 is inputted to a synchronization processing unit 18.

The synchronization unit 18 catches the symbol synchronization timing and frame synchronization timing of the OFDM signal received with use of a packet synchronization sequence 404. The synchronization unit 18 removes the preamble 401 from the baseband signal inputted from the orthogonal demodulation unit 14 and rotates the phase of the signal to correct the frequency error between the received signal carrier frequency and the local frequency used for the orthogonal demodulation. Then, the synchronization unit 18 outputs signals of the transmission line estimation sequence 405, header 402, and payload 403 as the phase-rotated baseband signals to the FFT unit 19. The synchronization unit 18 includes a correlator for computing a correlation value between the inputted baseband signal and the known preamble signal and determines a symbol synchronization timing of the received OFDM signal according to the peak position of the correlation value computed by the correlator.

The operation of a switching signal output from the synchronization unit 18 to the equalizer 20 will be described later. The FFT unit 19 executes fast Furrier conversion for baseband signals of which phase is rotated by the synchronization unit 18 respectively and outputs demodulated data of each sub-carrier.

Figure 3:
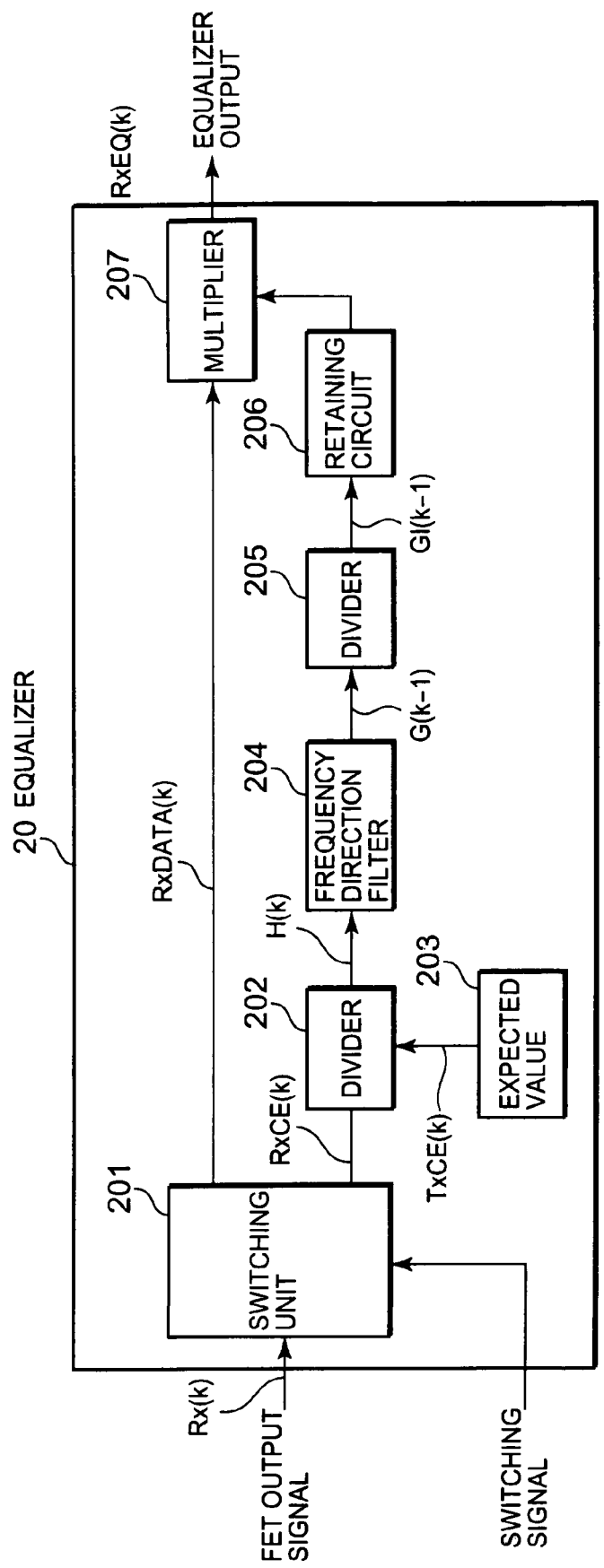
FIG. 3 is a block diagram for showing a configuration example of an equalizer 20 provided in the receiver used for the UWB wireless communications.

The equalizer 20 inputs demodulated data of each sub-carrier output from the FFT unit 19 and estimates transmission line characteristics of each sub-carrier with use of the transmission line estimation sequence 405 and equalizes the header 402 and the payload 403, then outputs an equalized signal. FIG. 3 shows an example of a detailed configuration of the equalizer 20. The equalizer 20 shown in FIG. 3, includes a switching unit 201, a divider 202, an expected value 203, a frequency direction filter 204, a divider 205, a retaining circuit 206, and a multiplier 207.

The switching unit 201 inputs switching signals output from the FFT unit 19 and the synchronization unit 18. A switching signal is a signal output from the FFT unit 19 and denotes either (1) a transmission line estimation sequence 405 or (2) the header 40 or the payload 403. The switching signal is inputted to the switching unit 201 from the synchronization unit 18. The switching device 201 switches the inputted signal destination between the divider 202 and the multiplier 207 according to the switching signal. Concretely, when the switching signal denotes that a transmission line estimation sequence 405 is output from the FFT unit 19, the switching unit 201 outputs the signal inputted from the FFT unit 19 to the divider 202 as is. On the other hand, when the switching signal denotes that the header 402 or payload 403 is output from the FFT unit 19, the switching unit 201 outputs the signal inputted from the FFT unit 19 to the multiplier 207.

In the following description, it is premised that both the header 402 and the payload 403 output from the switching unit 201 to the multiplier 207 are assumed as RxDATA(k) (k∈[−64, 63]). The transmission line estimation sequence 405 output from the switching unit 201 to the divider 202 is assumed as RxCE(k) (k∈[−64, 63]). Hereinafter, k is assumed as a variable denoting a sub-carrier number used to identify a sub-carrier. Also in the accompanying drawings, k is assumed as a variable denoting a sub-carrier number used to identify a sub-carrier similarly. "k∈[−64, 63]" denotes that k can take a value within −64 to 63 (−64≦k≦63).

The divider 202 inputs RxCE(k) output from the switching unit 201, as well as a transmission line estimation sequence expected value 203 (hereinafter, to be described as RxCE(k), k∈[−64, 63]) and outputs a transmission line characteristics estimation value (hereinafter, to be described as H(k), k∈[−64, 63]). The expected value 203 is premised to be retained in a memory such as a register. The relationship among H(k), RxCE(k), and TxCE(k) is represented as follows in (equation 1). In this specification, "X/Y" means that X is divided by Y.

$$H(k)=RxCE(k)/TxCE(k), k\in[-64, 63]$$ (Equation 1)

Figure 4:
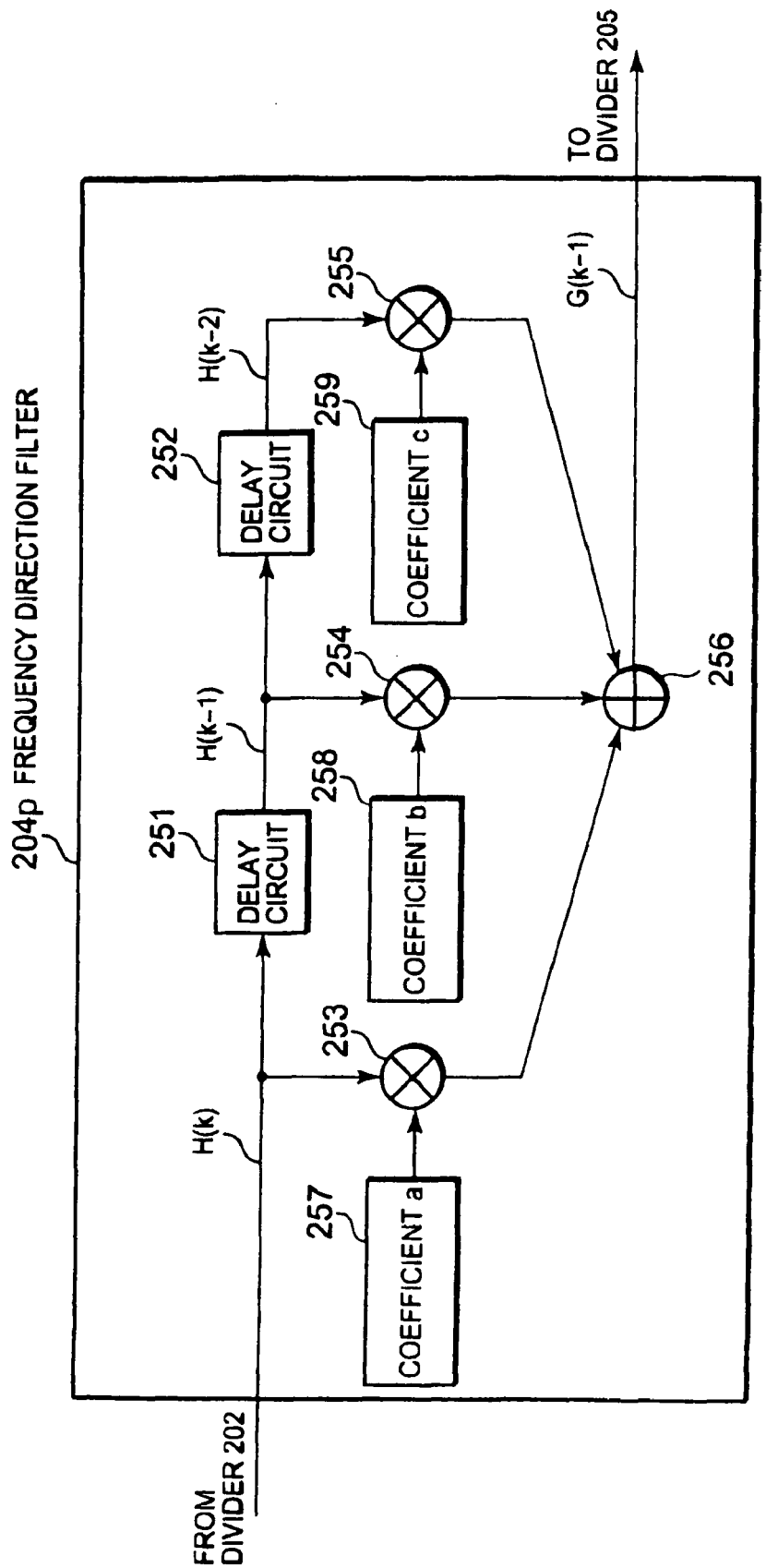
FIG. 4 is a block diagram for showing a configuration example of a frequency direction filter according to a conventional technique.

The frequency direction filter 204 smoothes the transmission line characteristics estimation value of each sub-carrier. FIG. 4 shows a block diagram for showing an example of a configuration of a frequency direction filter 204p according to a conventional technique. In FIG. 4, a 3-order filter is shown as an example. The frequency direction filter 204p includes delay circuits 251 and 252, multipliers 253 to 255, an adder 256, coefficients a257, b258, c258. The coefficients a257, b258, and c258 are assumed to be retained in a memory such as a register.

The frequency direction filter 204p inputs H(k) from the divider 202 and inputs the H(k) to both the delay circuit 251 and the multiplier 253. The delay circuit 251 inputs H(k) and outputs H(k−1) to both the delay circuit 252 and the multiplier 254. The delay circuit 252 inputs H(k−1) and outputs H(k−2) to the multiplier 255. The multiplier 253 outputs (H(k) and the multiplication result of the coefficient a to the adder 256. The multiplier 254 outputs H(k−1) and the multiplication result of the coefficient b to the adder 256. The adder 255 outputs H(k−1) and the multiplication result of the coefficient c to the adder 256. The adder 256 adds up H(k) and the multiplication result of the coefficient a, H(k−1) and the multiplication result of the coefficient b, as well as H(k−2) and the multiplication result of the coefficient c respectively, then assumes the result of the addition as a transmission line characteristics estimation value smoothed in the frequency direction filter 204p (hereinafter, to be described as G(k−1), k∈[−62, 63]), then outputs the value to the divider 205.

G(k−1) is output from the frequency direction filter 204 and represented as follows in (equation 2).

$$G(k-1) = a \times H(k) + b \times H(k-1) + c \times H(k-2), k \in [-2, 63] \quad \text{[Equation 2]}$$

In (equation 2), a, b, and c denote coefficients a, b, and c. The coefficients a, b, and c are filter coefficients to determine the frequency characteristics of the frequency direction filter 204. Those coefficients are obtained from evaluation or simulation. For example, they are obtained like a=⅓, b=⅓, and c=⅓. Return to FIG. 3. The output G(k−1) from the frequency direction filter 204 (that means the frequency direction filter 204p here) is inputted to the divider 205.

The divider 205 calculates a transmission line correction coefficient (hereinafter, to be described as GI(k−1)) according to G(k−1) (k∈[−62, 63]) inputted from the frequency direction filter 204 and outputs the result GI(k−1) to the retaining circuit 206. Here, the relationship between G(k−1) and GI(k−1) is represented as follows in (equation 3).

$$GI(k-1) = 1/G(k-1), (k \in [-62, 63]) \quad \text{(Equation 3)}$$

The retaining circuit 206 inputs and retains GI(k−1) (k∈[−62, 63]) obtained in the divider 205. The multiplier 207 inputs RxDATA(k) that is either the header 402 or the payload 403 output from the switching unit 201 and GI(k−1) that is a transmission line correction coefficient of the retaining circuit 206. RxDATA becomes k∈[−64, 63] and GI(k−1) becomes k∈[−62, 63]. And because the initially placed sub-carrier numbers −64 and −63 are deviated from each other, both the sub-carrier numbers are put together to execute a calculation. The calculation result is output from the equalizer 20. Hereinafter, the result is assumed as RxEQ(k). RxEQ(k) is represented as follows in (equation 4).

$$RxEQ(k) = RxDATA(k) \times GI(k), k \in [-63, 62] \quad \text{(Equation 4)}$$

Figure 5:
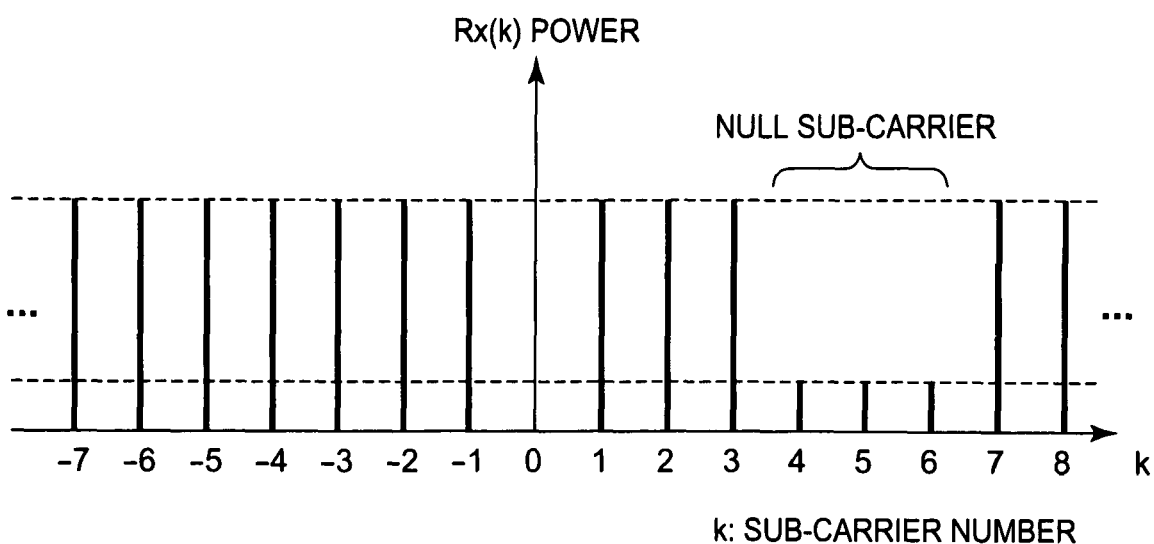
FIG. 5 is a diagram for describing a spectrum assumed when the receiver receives a signal that includes a null sub-carrier as a result of tone nulling executed for the fourth, fifth, and sixth sub-carriers at the sending side.
Figure 6:
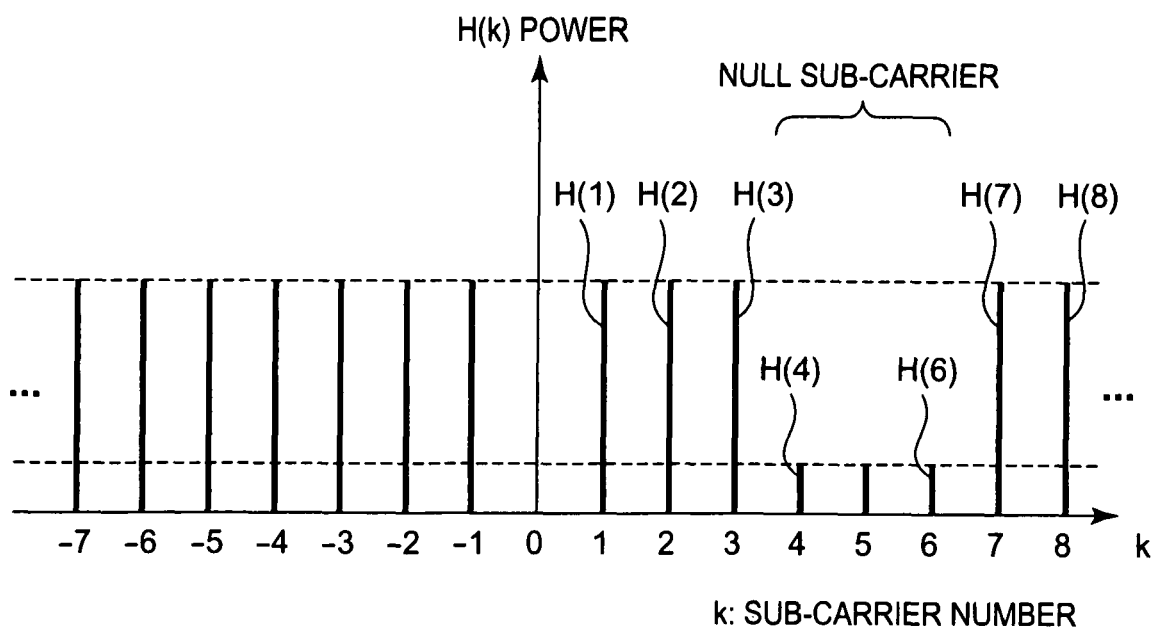
FIG. 6 is a diagram for describing a spectrum of a transmission line characteristics estimation value H(k) output when a transmission line estimation sequence 405 having a spectrum as shown in FIG. 5 is divided by an expected value 203.
Figure 7:
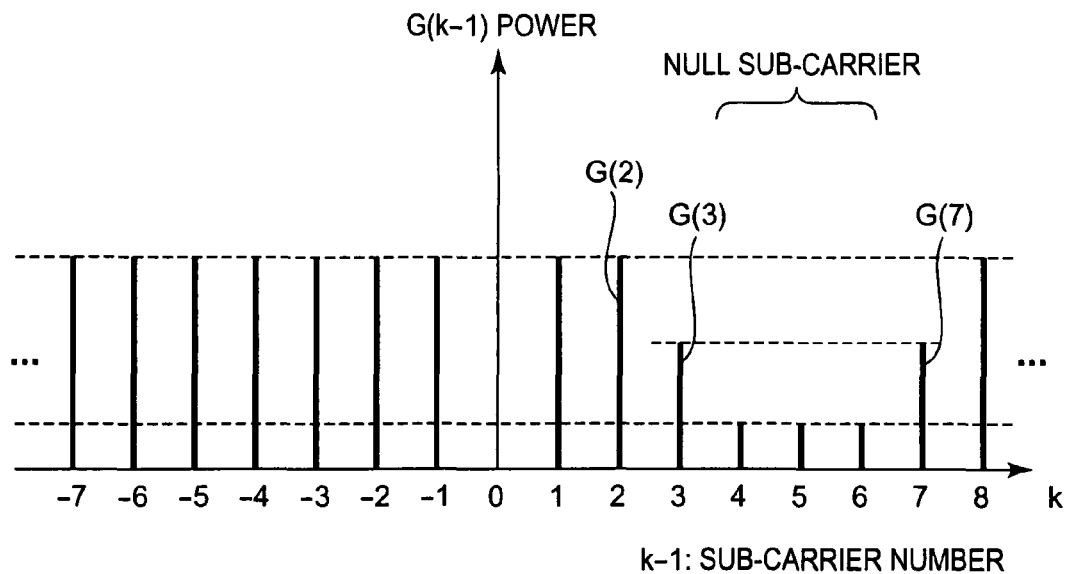
FIG. 7 is a diagram for describing a spectrum of a smoothed transmission line characteristics estimation value G(k−1) output from a frequency direction filter 204p when a transmission line characteristics estimation value H(k) having a spectrum as shown in FIG. 6 is inputted to a frequency direction filter 204p according to a conventional technique.

This completes the description of the operation of the receiver. Next, there will be described an error of the transmission line characteristics estimation value G(k−1) to occur when a conventional frequency direction filter 204p is provided in the equalizer 20. What becomes a problem here is an error of a smoothed transmission line characteristics estimation value G(k−1) when a sub-carrier that is not sent (no data is assigned to the sub-carrier) due to a tone nulling processing (hereinafter, to be referred to as a null sub-carrier) is included. Hereunder, such a G(k−1) error will be described concretely. FIG. 5 is an explanatory diagram of a spectrum of a received signal that is tone-nulled in the subject transmitter. In FIG. 5, the transmitter executed tone nulling for the fourth, fifth, and sixth sub-carriers. FIG. 6 is an explanatory diagram of a spectrum of a power having a transmission line characteristics estimation value H(k) obtained from the received spectrum shown in FIG. 5 and an expected value 203 of the transmission line estimation sequence 405. FIG. 7 shows an explanatory diagram of a power having a smoothed transmission line characteristics estimation value G(k−1) when the transmission line characteristics estimation value H(k) obtained in FIG. 6 is inputted to the frequency direction filter 204p.

The operation of the frequency direction filter 204p becomes as shown in (equation 2). Concretely, in FIG. 7, the sub-carrier number of H(k) inputted to the frequency direction filter 204 is assumed to be k=3, sub-carrier transmission line characteristics estimation values H(3), H(2), and H(1) that are not null sub-carriers in (equation 2) are inputted to the frequency direction filter 204, then a smoothed transmission line characteristics estimation value G(2) is output from the filter 204. On the other hand, if the H(k) sub-carrier number inputted to the frequency direction filter 204 is assumed to be k=4, a null sub-carrier transmission line characteristics estimation values H(4), H(3), and H(2) that are not null sub-carriers are inputted to the filter 204 and a smoothed transmission line characteristics estimation value G(3) is output from the filter 204. If H(k) sub-carrier number inputted to the frequency direction filter 204 is assumed to be k=7, a null sub-carrier transmission line characteristics estimation value H(6), H(7), and H(8) that are not null sub-carriers are inputted to the frequency direction filter 204, then the frequency direction filter 204 outputs a smoothed transmission line characteristics estimation value H(7).

As shown in FIG. 7, in calculation for smoothing a combination of a null sub-carrier and another sub-carrier, a power of a smoothed transmission line characteristics estimation value falls like G(3) and G(7). Thus the transmission line estimation error of a smoothed transmission line characteristics estimation value G(k), when a null sub-carrier is included, becomes larger than that when no null sub-carrier is included. This causes an error of the transmission line characteristics estimation value G(k−1).

Figure 8:
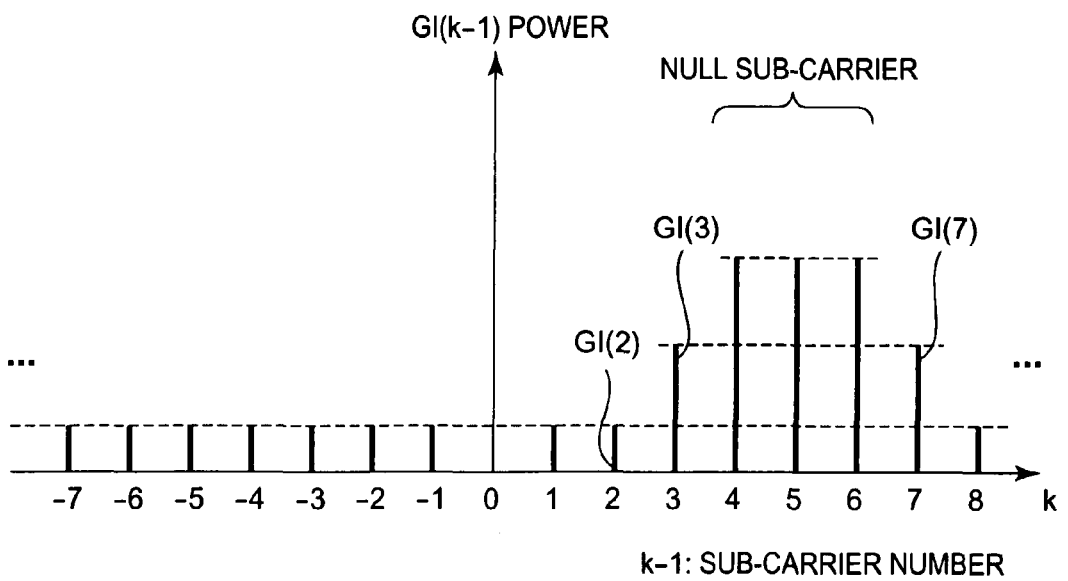
FIG. 8 is a diagram for describing a spectrum of a transmission line correction coefficient GI(k−1) output from a divider 205 when a smoothed transmission line characteristics estimation value G(k−1) having a spectrum shown in FIG. 7 is inputted to a divider 205.

FIG. 8 shows an explanatory diagram of a power spectrum of a transmission line correction coefficient GI(k−1) assumed after an inverted number calculation is executed as shown in (equation 3) from the smoothed transmission line characteristics estimation value G(k−1) obtained in FIG. 7. The expected values of the transmission line correction coefficients GI(3) and GI(7) are GI(2) respectively, but the error generated in each of the transmission line characteristics estimation values G(3) and G(7) makes the power of the transmission line correction coefficient larger than GI(2).

Figure 9:
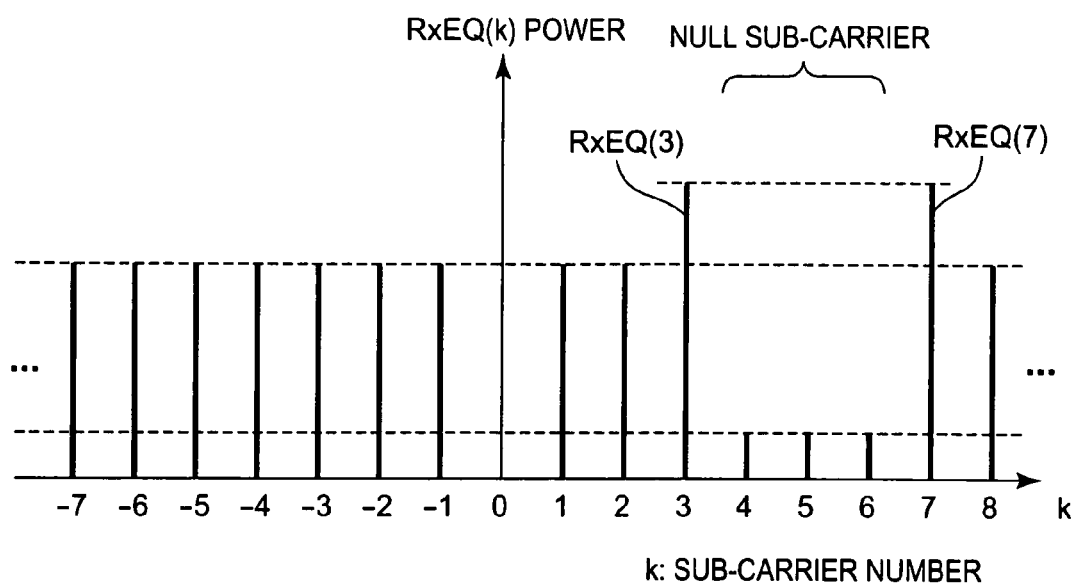
FIG. 9 is a diagram for describing a spectrum of a signal RxEQ(k) after an equalization processing, obtained by multiplying a received signal Rx(k) having a spectrum shown in FIG. 5 by a transmission line correction coefficient GI(k−1) having a spectrum shown in FIG. 8.

FIG. 9 shows an explanatory diagram of a spectrum of the header 402 or payload 403 assumed after a multiplication (equalization processing) is executed as shown in (equation 4) according to RxDATA(k) of the header 402 and the payload 403, as well as the transmission line correction coefficient GI(k−1) having a spectrum as shown in FIG. 8. After the equalization processing, ripples are generated in each of the sub-carriers RxEQ(3) and RxEQ(7) adjacent to a null sub-carrier respectively, since the power of the sub-carrier (not null sub-carrier) adjacent to a null sub-carrier increases.

Figure 10:
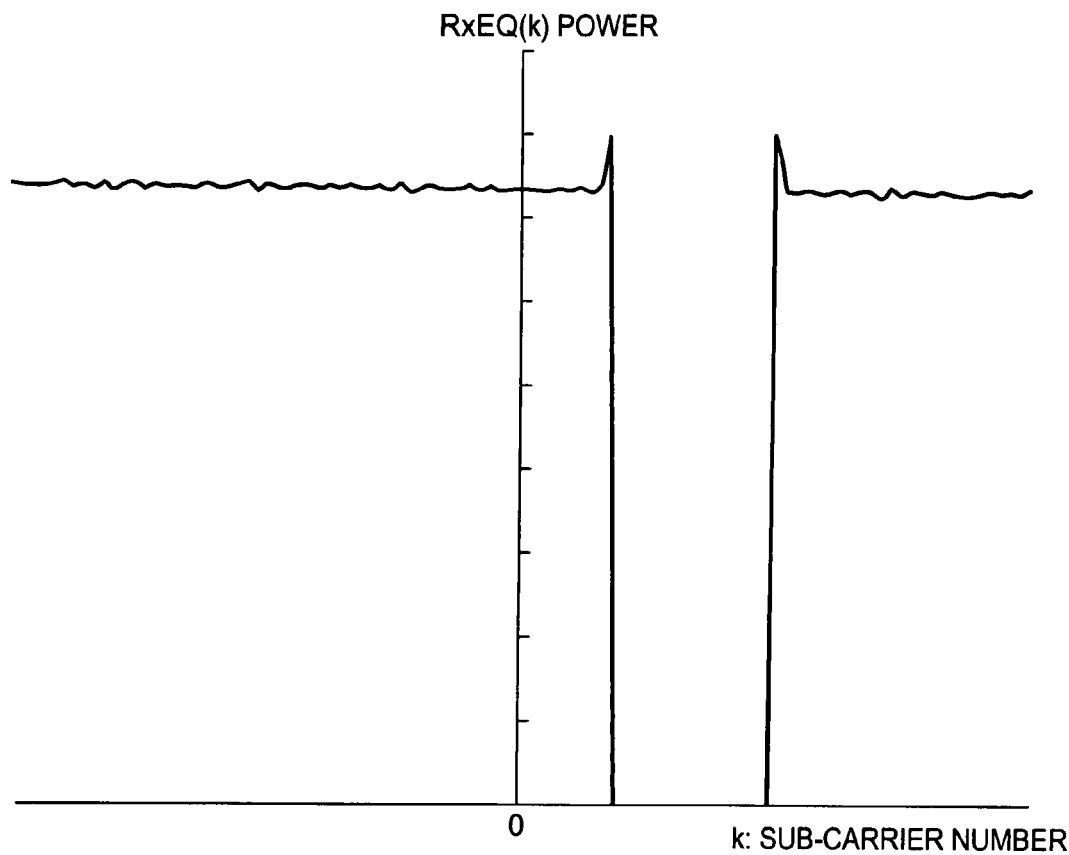
FIG. 10 is a diagram for describing a spectrum of a signal RxEQ(k) received after it is tone-nulled at the sending side, then equalized with use of a frequency direction filter 204p formed with a conventional technique.

FIG. 10 shows an example of a simulation result and a spectrum obtained after an equalization processing is executed with use of a conventional frequency direction filter 204p. Ripples generated in FIG. 10 cause a transmission line estimation error with respect to the header 402 or payload 403 after an equalization processing.

Such a transmission line estimation error is considered to be caused by an error generated in the transmission line characteristics estimation value G(k−1) after smoothing of a sub-carrier (not null sub-carrier) adjacent to a null sub-carrier (or a sub-carrier of which transmission line characteristics estimation value is over a predetermined value and smaller than the transmission line characteristics estimation value of its adjacent sub-carrier). If such an error occurs, the required CNR increases, resulting in shortening of the communication distance. To avoid such a problem, the present invention uses a frequency direction filter for substituting the transmission line characteristics estimation value of a sub-carrier, which is smaller than a predetermined threshold value like a null sub-carrier for the transmission line characteristics estimation value of its adjacent sub-carrier, then smoothing the substituted transmission line characteristics estimation value.

Figure 11:
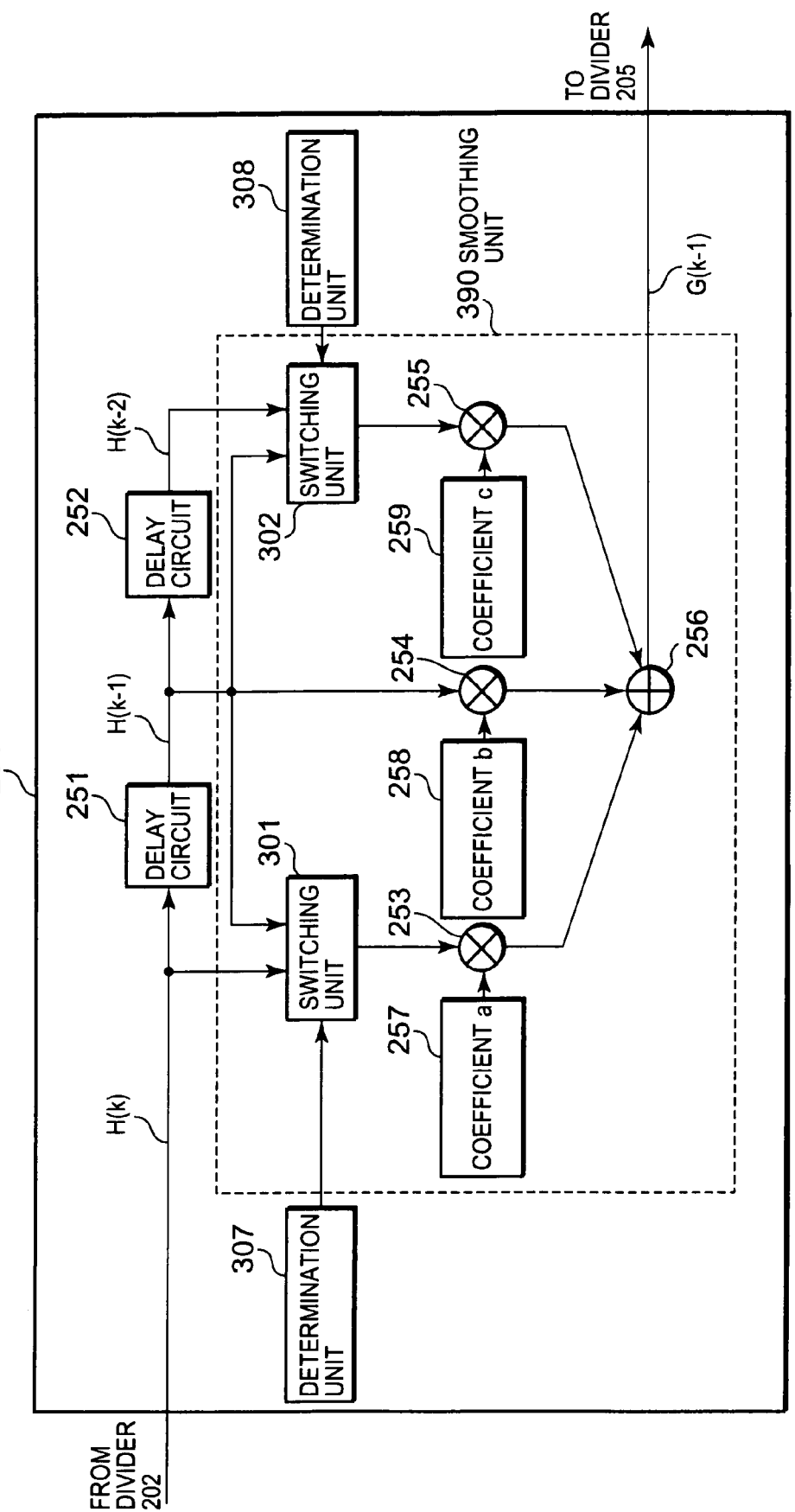
FIG. 11 is a schematic block diagram for showing a configuration example of a frequency direction filter 204 of the present invention.

In the description to be made below, a same reference numeral as that of the frequency direction filter 204p shown in FIG. 4 will be used for each similar component, avoiding redundant description. The configurations and operations of all the components except for the frequency direction filter 204 are the same as those described above, so that the descriptions for them will be omitted here. FIG. 11 shows a schematic block diagram of a configuration example of the frequency direction filter 204 of the present invention. The frequency direction filter 204 shown in FIG. 11 is the same as that of the frequency direction filter 204p shown in FIG. 4 except that switching units 301 and 302 and determination units 307 and 308 are provided newly in the frequency direction filter 204. In FIG. 11 and in the embodiments to be described below, the frequency direction filter 204 does not include the conventional frequency direction filter 204p shown in FIG. 4. And a target sub-carrier to be processed means a sub-carrier for which a smoothed transmission line characteristics estimation value is to be calculated.

Each of the determination units 307 and 308 determines whether or not the transmission line characteristics estimation value of a sub-carrier adjacent to a given sub-carrier is smaller than a predetermined threshold value, thereby determining whether or not the adjacent sub-carrier is a null sub-carrier, then outputs the determination result to the corresponding one of the switching units 301 and 302. For example, each of the determination units 307 and 308 determines whether or not a transmission line characteristics estimation value is smaller than a predetermined threshold value, whether or not the difference between two transmission line characteristics estimation values is over a predetermined threshold value and the adjacent sub-carrier transmission line characteristics estimation value is small, or whether or not the ratio between the two transmission line characteristics estimation values is over a predetermined threshold value and the adjacent sub-carrier transmission line characteristics estimation value is small, thereby determining a target transmission line characteristics estimation value. Each of the determination units 307 and 308 may also determine a sub-carrier of which transmission line characteristics estimation value is smaller than a predetermined sub-carrier (sub-carrier of which transmission line characteristics estimation value is substituted for another) with use of a method for identifying a sub-carrier of which transmission line characteristics estimation value is smaller than a predetermined threshold value.

Each of the switching units 301 and 302 retains a transmission line characteristics estimation value of a given sub-carrier inputted from a divider 202 and a transmission line characteristics estimation value of a sub-carrier adjacent to the given sub-carrier (in FIG. 11, the transmission line characteristics estimation values of the k-th, k-1st, or k-1st and k-2nd sub-carriers) and switches between the transmission line characteristics estimation value of the given sub-carrier and that of its adjacent sub-carrier according to the determination result of the determination unit 307/308, then outputs the switched transmission line characteristics estimation value to the multiplier 253. The switching unit 302 switches between H(k−1) and H(k−1) and outputs the switched one to the multiplier 255. Consequently, the frequency direction filter 204 shown in FIG. 11 differs from the frequency direction filter 204p shown in FIG. 4 in that the multipliers 253 and 255 input transmission line characteristics estimation values from the switching units 301 and 302.

The smoothing unit 390 smoothes the transmission line characteristics estimation value of a target sub-carrier to be processed by excluding the transmission line characteristics estimation value of its adjacent sub-carrier determined as a null sub-carrier by any of the determination units 307 and 308. Concretely, the smoothing unit 390 smoothes the transmission line characteristics estimation value according to the transmission line characteristics estimation value output from any of the switching units 301 and 302. For example, in FIG. 11, the smoothing unit includes switching units 301 and 302, multipliers 253, 254, and 255, coefficients 257, 258, and 259, and an adder 256.

This completes the description of the schematic configuration of the frequency direction filter 204 of the present invention. In each of the embodiments to be described below, there will be described this concrete configuration example of the frequency direction filter 204 shown in FIG. 11. Particularly, hereinafter, there will be described each of the components equivalent to the determination units 307 and 308. Also in the following description, a null sub-carrier is a sub-carrier of which transmission line characteristics estimation value is not included in the smoothing process of the transmission line characteristics estimation value of each of a plurality of sub-carriers. Concretely, it is a sub-carrier that is understood beforehand as a sub-carrier to which no data is to be assigned or a sub-carrier of which transmission line characteristics estimation value is over a predetermined threshold value, but smaller than the transmission line characteristics estimation value of its adjacent sub-carrier. Consequently, a null sub-carrier is subjected to determination by the determination units 307 and 308 only when its transmission line characteristics estimation value is substituted for another, thereby the transmission line estimation error is reduced.

As shown in FIG. 11, the transmission line characteristics estimation value of a predetermined sub-carrier is substituted for that of another sub-carrier, smoothed, and calculated to solve the problem that cannot be solved by the patent document 1. Concretely, the patent document 1 discloses a method for reducing a transmission line estimation error generated in a sub-carrier at the end of the subject signal band by copying the transmission line characteristics of a pilot sub-carrier in a band into a predetermined section outside the signal band. However, the above method for reducing the transmission line estimation error disclosed in the patent document 1 cannot apply to a packet communication system that estimates a transmission line with use of a transmission line estimation sequence 405 set at the initial position of each packet in the UWB wireless communication, thereby correcting the transmission line characteristics of the header 402 and the payload 403 to be received subsequently. The method for reducing the transmission line estimation error disclosed in the patent document 1 is used for, for example, a stream data communication system employed for digital terrestrial broadcasting.

The method for reducing the transmission line estimation error disclosed in the patent document 1 reduces the transmission line estimation error generated at the end of the subject signal band. In each of the preferred embodiments of the present invention, the transmission line estimation error generated in a given sub-carrier can be reduced through tone nulling and fading.

First Embodiment

Figure 12:
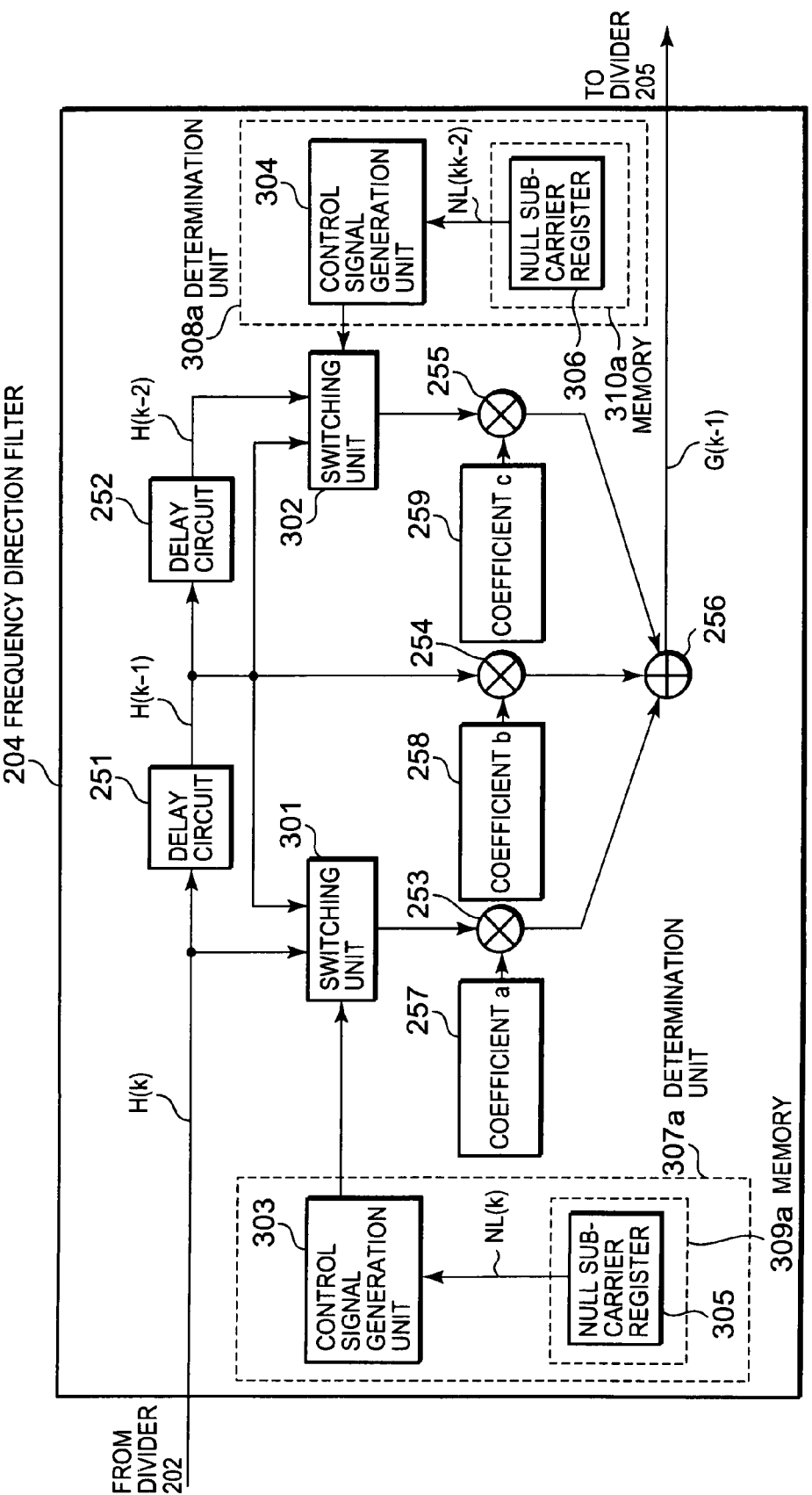
FIG. 12 is a block diagram for showing a configuration example of a frequency direction filter 204a in a first embodiment of the present invention.

In the first embodiment, there will be described an example of a frequency direction filter that substitutes a transmission line characteristics estimation value for another when an idle frequency band (to which no data is assigned) is predetermined in the UWB communication. FIG. 12 shows a configuration example of a frequency direction filter 204a in the first embodiment of the present invention. In this embodiment, it is premised in the subject system that the receiver is notified that the subject sub-carrier being processed is a null sub-carrier or a sub-carrier being processed in the receiver is known beforehand as a null sub-carrier.

The frequency direction filter 204a shown in FIG. 12 is a concrete configuration example of each of the determination units 307 and 308 of the frequency direction filter 204 shown in FIG. 11. As shown in FIG. 12, the determination unit 307a includes a control signal generation unit 303 and a null sub-carrier register 305 and the determination unit 308a includes a control signal generation unit 304 and a null sub-carrier register 306. Each of the null sub-carrier registers 305 and 306 retains sub-carrier information for identifying a sub-carrier among a plurality of sub-carriers, which is determined beforehand not to be assigned any data (not to be used) as a sub-carrier of which transmission line characteristics estimation value is substituted for another.

Figures 13, 14:
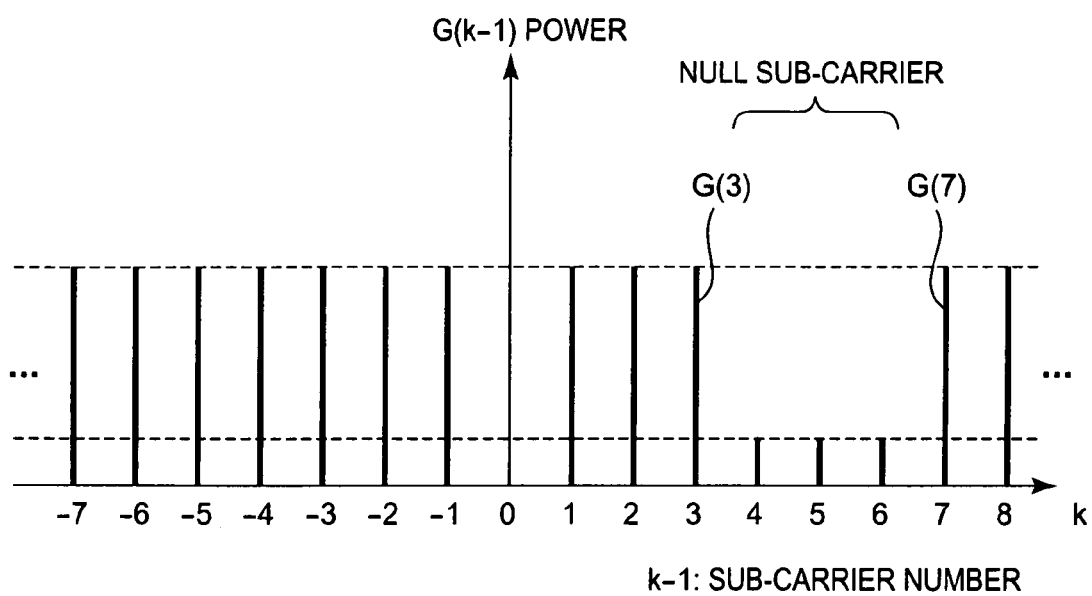
FIG. 13 is a diagram for showing an example of values retained by a null sub-carrier register 305/306 shown in FIG. 12.
FIG. 14 is a diagram for describing a spectrum of a smoothed transmission line characteristics estimation value G(k−1) when a transmission line characteristics estimation value H(k) having a spectrum shown in FIG. 6 is inputted to the frequency direction filter 204a in the first embodiment of the present invention.

In case where a sub-carrier is determined so as not to be assigned any data, the case is equivalent to a case in which a sub-carrier used by a different wireless communication apparatus is determined beforehand as a null sub-carrier. FIG. 13 shows an example of a null sub-carrier register 305/306. The null sub-carrier register shown in FIG. 13 is just an example; the register may be a different device other than a register. It may be a storage area for retaining sub-carrier information for identifying a null sub-carrier. Not only the null sub-carrier registers 305 and 306, but also an area for notifying the switching units 301 and 302 of whether or not a sub-carrier is a null sub-carrier may be referred to as a memory 309a/310a.

Each of the control signal generation units 303 and 304 outputs a control signal for instructing the object unit to output the adjacent sub-carrier transmission line characteristics estimation value to the switching unit 301/302 according to the information retained in the null sub-carrier register 305/306.

As shown in FIGS. 11 and 12 respectively, the configuration that can substitute the input to the multiplier 253 for H(k) and H(k−1) and the configuration that can substitute the input to the multiplier 255 for H(k−2) and H(k−1) can suppress the transmission line estimation error for the following reasons.

(1) In FIG. 12, in case where H(k−1) is not a null sub-carrier and H(k) or H(k−2) is a null sub-carrier, the input to the multiplier 253 or 255 can be substituted for H(k−1). If smoothing is made while H(k) or H(k−2) is a null sub-carrier, the error of the transmission line characteristics estimation value increases, so that the transmission line characteristics estimation value H(k) or H(k−2) of a null sub-carrier is substituted for the transmission line characteristics estimation value H(k−1) of its adjacent sub-carrier that is not a null sub-carrier.

(2) In FIG. 12, even when H(k) or H(k−2) is substituted for H(k−1), the error of the transmission line characteristics estimation value is reduced. This is because an influence of fading in an adjacent sub-carrier or a sub-carrier adjacent to the adjacent sub-carrier is related strongly to the self-sub-carrier. This is understood from an experiment result of fading executed with use of an antenna and confirmed by a simulation.

Next, there will be described the operation of the frequency direction filter 204a in this embodiment with reference to FIGS. 12 and 13. The null sub-carrier register 305 retains, for example, null sub-carrier indicating information (hereinafter, described as NL(k), k∈[−64, 63]) as shown in FIG. 13. NL(k)=1 denotes that the k-th sub-carrier is a tone-nulled sub-carrier and NL(k)=0 denotes that the k-th sub-carrier is not a tone-nulled sub-carrier. The null sub-carrier register 305 outputs NL(k) of the k-th sub-carrier number to the control signal generation unit 303. The null sub-carrier register 306 also retains null sub-carrier indicating information as shown in FIG. 13 just like the null sub-carrier register 305. The null sub-carrier register 306 outputs NL(k−2) of the k-2nd sub-carrier number to the control signal generation unit 304.

The control signal generation unit 303, when NL(k) is 1, outputs a signal that switches the output of the switching unit 301 to H(k−1) to the switching unit 301, since H(k) becomes a null sub-carrier. If NL(k) is 0, H(k) does not denote the transmission line characteristics estimation value of a null sub-carrier. Thus the control signal generation unit 303 outputs a signal that switches the output of the switching unit 301 to H(k) to the switching unit 301. If NL(k−2) is 1, H(k−2) denotes the transmission line characteristics estimation value of a null sub-carrier. Thus the control signal generation unit 304 outputs a signal that switches the output of the switching unit 302 to H(k−1) to the switching unit 302. If NL(k−2) is 0, H(k−2) does not denote the transmission line characteristics estimation value of a null sub-carrier. Thus the control signal generation unit 304 outputs a signal that switches the output of the switching unit 302 to H(k−2) to the switching unit 302.

The switching unit 301 inputs H(k), H(k−1), as well as a signal from the control signal generation unit 303 and switches the output of the switching unit 301 between H(k) and H(k−1) according to the inputted signal, then outputs the result to the multiplier 253. The switching unit 302 inputs H(k−2), H(k−1), as well as a signal from the control signal generation unit 304 and switches the output of the switching unit 302 between H(k−2) and H(k−1) according to the inputted signal, then outputs the result to the multiplier 255.

In the operation described above, if H(k) and G(k−1) are assumed as the input and the output of the frequency direction filter 204a respectively, both H(k) and G(k−1) can be represented as follows in (equation 5), (equation 6), (equation 7), and (equation 2) respectively. In any case, k∈[−62, 63] is assumed. However, if the k-1st sub-carrier is a null sub-carrier, G(k−1)=H(k−1) is satisfied. To satisfy this G(k−1)=H(k−1), for example, any of the following means is effective; the switching unit 301/302 may output H(k−1), zero (0) may be set for both coefficients a and c so that the value of the coefficient b is calculated as a+b+c, and any other means may be used. If a target sub-carrier to be processed is a null sub-carrier, the following method (4) may be used, since the multiplier 207 requires any correcting accuracy for the header 402 and the payload 403.

(1) If the k-1st sub-carrier is not a null sub-carrier and the k-th sub-carrier is a null sub-carrier, that is, NL(k−1)=0 and NL(k)=1 are satisfied;

$$G(k-1)=a \times H(k-1)+b \times H(k-1)+c \times H(k-2) \qquad \text{(Equation 5)}$$

(2) If the k-1st sub-carrier is not a null sub-carrier and the k-2nd sub-carrier is a null sub-carrier, that is, NL(k−1)=0 and NL(k−2)=1 are satisfied;

$$G(k-1)=a \times H(k)+b \times H(k-1)+c \times H(k-1) \qquad \text{(Equation 6)}$$

(3) If the above (1) and (2) conditions are satisfied simultaneously, $$G(k-1)=a \times H(k-1)+b \times H(k-1)+c \times H(k-1) \qquad \text{(Equation 7)}$$

(4) If none of the (1), (2), and (3) conditions is satisfied, The operation is the same as that in equation (2), so that the description is omitted here. In FIG. 12, while H(k−1) does not denote a null sub-carrier, if its adjacent sub-carrier, that is, H(k) or H(k−2) denotes a null sub-carrier, the input to the multiplier 253 is changed from H(k) to H(k−1) (operation of (equation 5) or the input to the multiplier 255 is changed from H(k−2) to H(k−1) (operation of (equation 6)).

Figure 15:
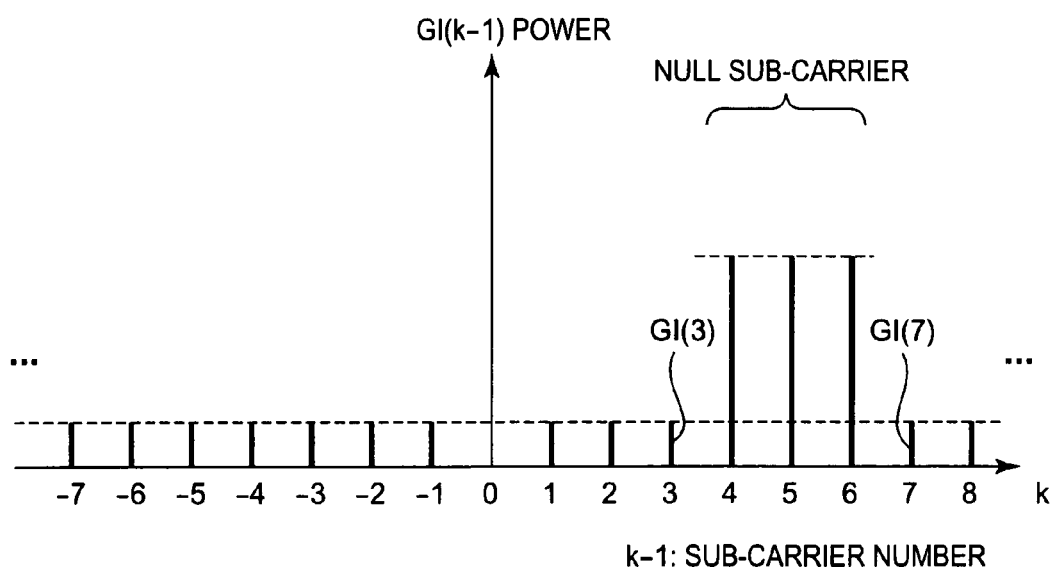
FIG. 15 is a diagram for describing a spectrum of a transmission line correction coefficient GI(k−1) output from the divider 205 when a smoothed transmission line characteristics estimation value G(k−1) having a spectrum shown in FIG. 14 is inputted to the divider 205.
Figure 16:
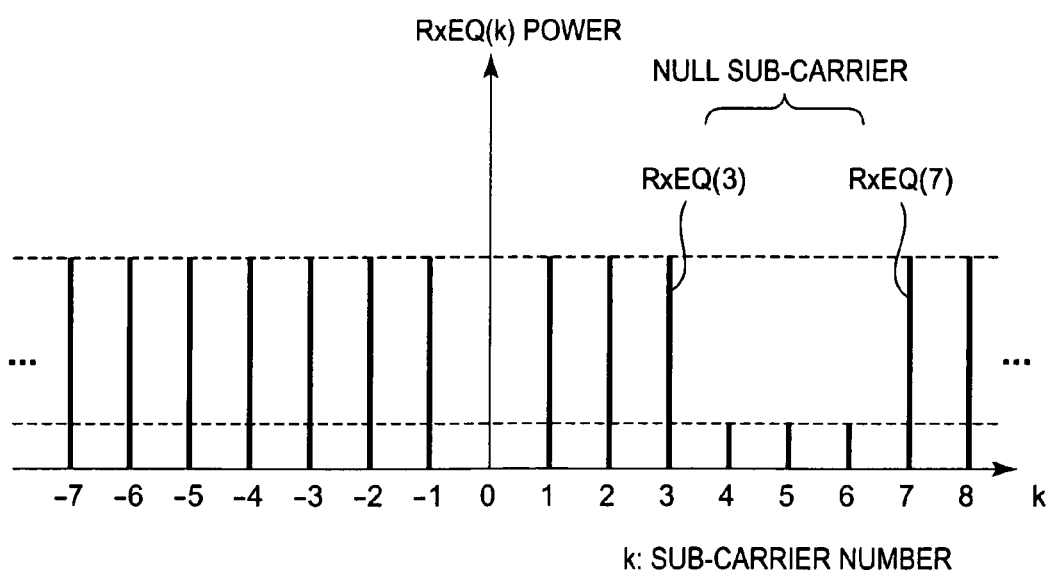
FIG. 16 is a diagram for describing a spectrum of an equalized signal RxEQ(k) obtained by multiplying a received signal Rx(k) having the spectrum shown in FIG. 5 by a transmission line correction coefficient GI(k−1) having a spectrum shown in FIG. 15.

FIG. 14 shows an explanatory diagram of a spectrum of the transmission line characteristics estimation value G(k−1) assumed after smoothing is executed by the frequency direction filter 204 shown in FIG. 12 according to the present invention. FIG. 15 shows an explanatory diagram of a power spectrum of a transmission line correction coefficient GI(k−1) assumed after an inverted number calculation is made as shown in (equation 3) from the transmission line characteristics estimation value G(k−1) after smoothing is executed as shown in FIG. 14 according to the present invention. FIG. 16 shows an explanatory diagram of a spectrum of the header 402 or payload 403 after a multiplication processing (equalization processing) is executed as shown in (equation 4) according to RxDATA(k) of the header 402 and the payload 403 selected from the Rx(k) input to the equalizer 20 having a spectrum shown in FIG. 5 and the transmission line correction coefficient GI(k−1) having a spectrum shown in FIG. 15 according to the present invention.

In FIG. 7 that shows an output of the conventional frequency direction filter 204p, the spectra shown with G(3) and G(7) are reduced in power through smoothing executed with respect to a null sub-carrier. On the other hand, if the frequency direction filter 204a in this embodiment is used, the power of the spectra shown with G(3) and G(7) in FIG. 14 are the same as that of adjacent G(2) found from a transmission line characteristics estimation value of a sub-carrier that is not a null sub-carrier, so that the error of the transmission line characteristics estimation value G(k−1) is reduced. As a result, as shown in FIG. 15, it is possible to reduce the error of the transmission line correction coefficients GI(3) and GI(7) and to reduce ripples like the equalizer outputs RxEQ(3) and RxEQ(7) shown in FIG. 16.

Figure 17:
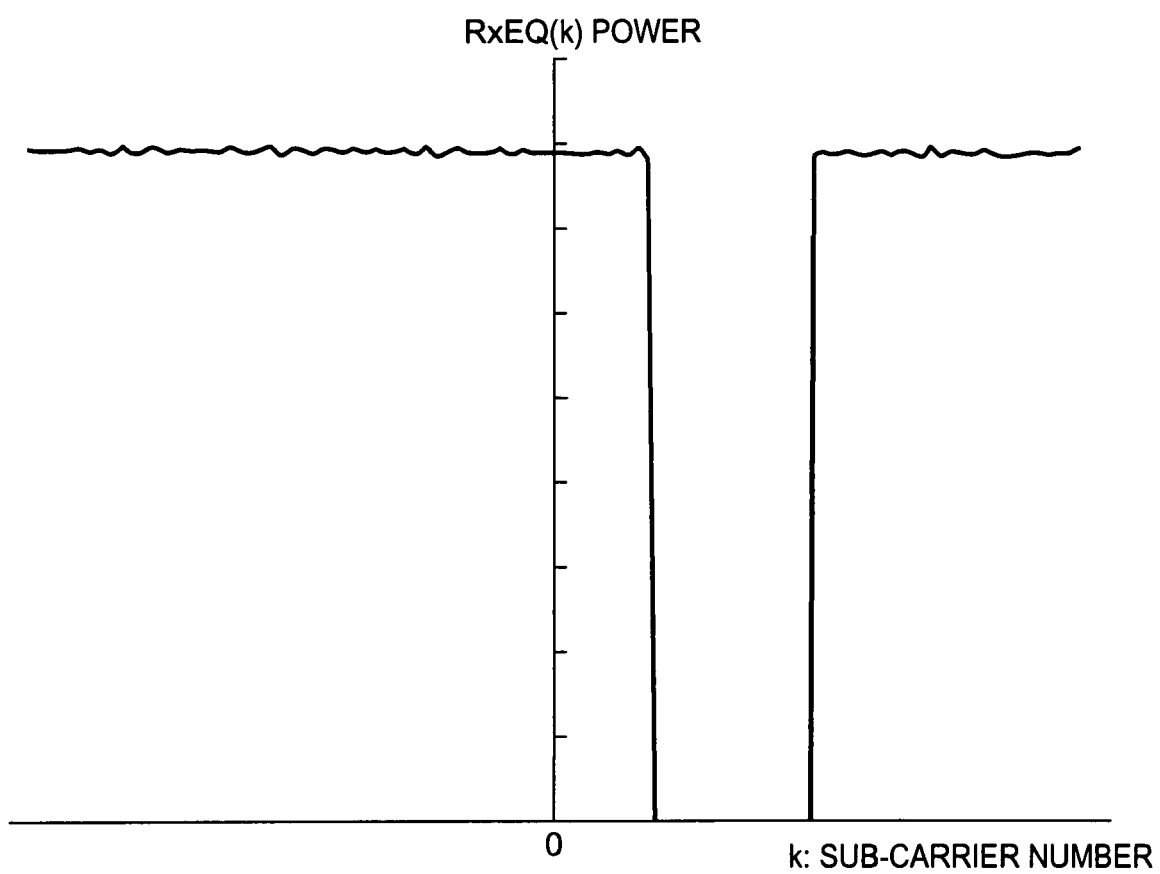
FIG. 17 is an example of a spectrum of a signal RxEQ(k) received after it is tone-nulled at the sending side, then equalized with use of a frequency direction filter 204a (FIG. 12)
Figure 18:
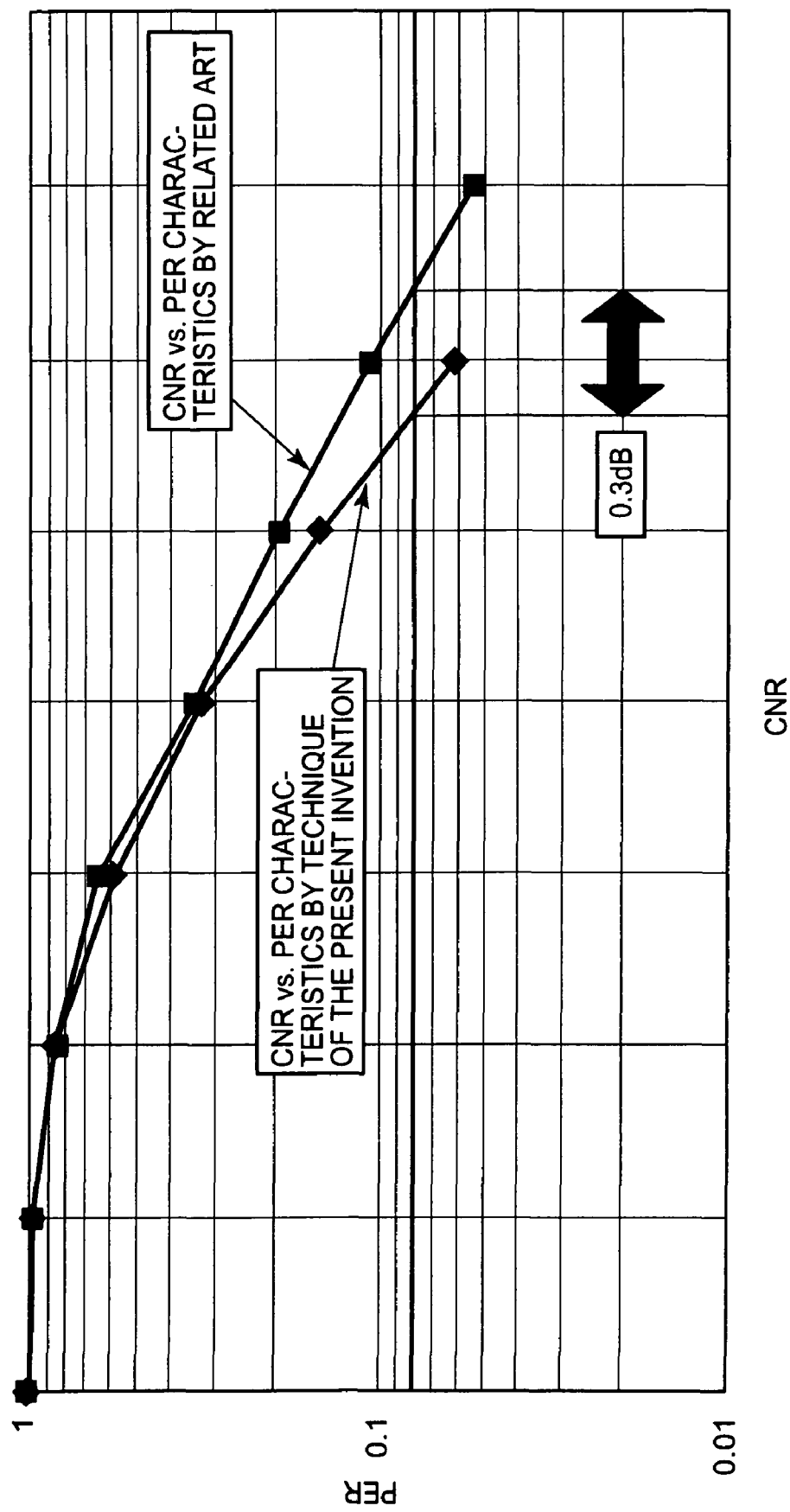
FIG. 18 is an example of a result of equalization for CNR vs. PER according to a conventional technique and with use of a frequency direction filter 204a the first embodiment of the present invention.

FIG. 17 shows an example of a simulation result, that is, a spectrum assumed after an equalization processing is executed with use of the frequency direction filter 204a. In comparison with the result of the simulation executed with use of the conventional frequency direction filter 204 shown in FIG. 10, the ripples of the sub-carrier adjacent to a tone-nulled sub-carrier is reduced as shown in FIG. 17. If the ripples of the equalizer output RxEQ(k) is reduced, the packet error rate is improved. FIG. 18 shows CNR vs. PER characteristics. In comparison with the equalization processing executed with use of the conventional frequency direction filter 204p, the equalization processing executed with use of the frequency direction filter 204a in this embodiment can improve the required CNR by 0.3 dB, thereby the communication distance is extended more.

In such a way, in this embodiment, the subject wireless communication apparatus retains sub-carrier information (e.g., null sub-carrier indicating information) for identifying a sub-carrier set so as not to be used by the apparatus beforehand and substitutes the transmission line characteristics estimation value of a null sub-carrier for the transmission line characteristics estimation value of its adjacent sub-carrier according to the retained sub-carrier information, thereby reducing the transmission line estimation error generated in a smoothing processing of the transmission line characteristics estimation value between adjacent sub-carriers. Consequently, the required CNR can be suppressed from increasing, thereby the communication distance can be prevented from being shortened due to the increase of the required CNR.

Second Embodiment

Figure 19:
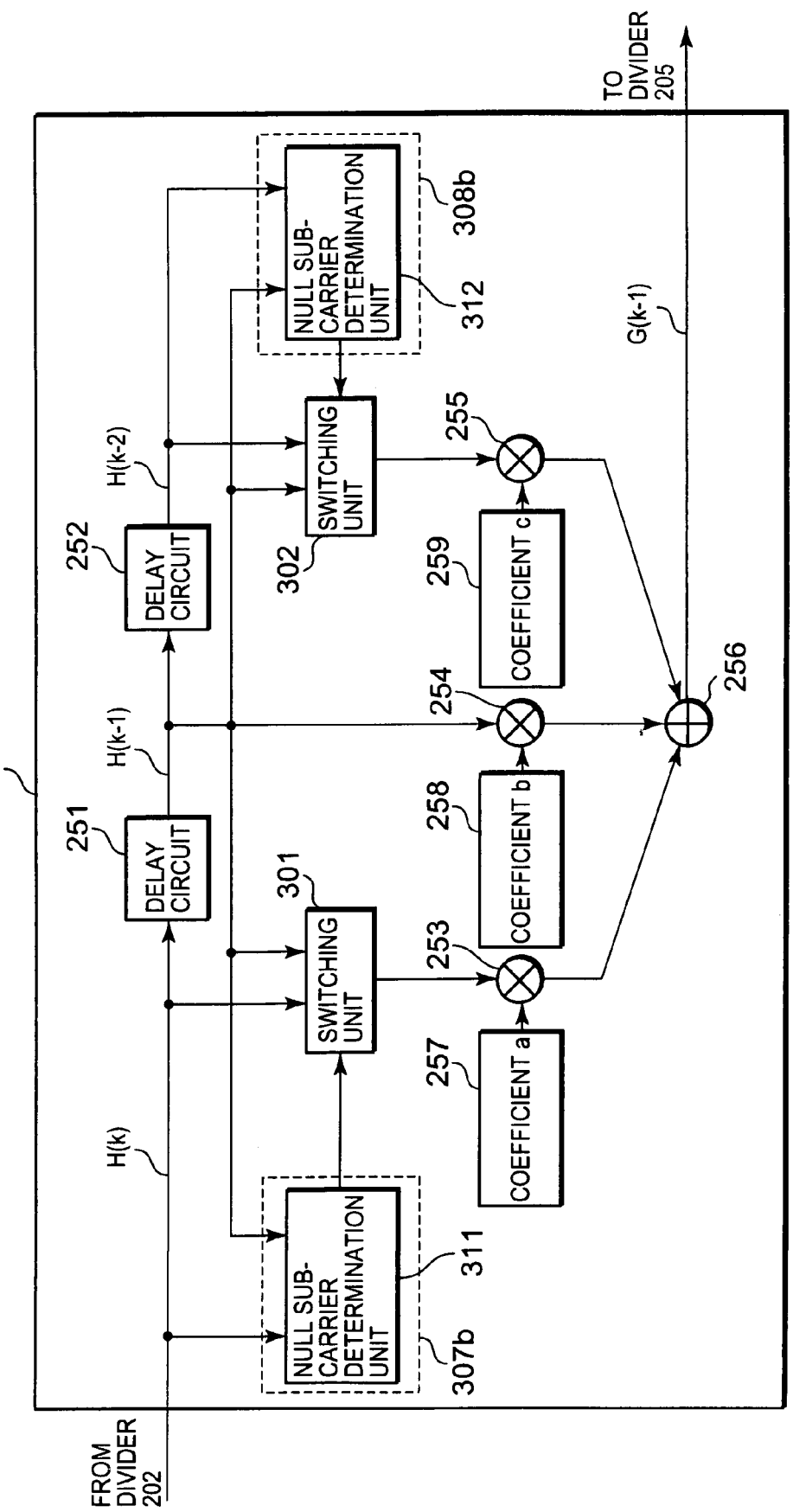
FIG. 19 is a block diagram for showing a configuration example of a frequency direction filter 204b in a second embodiment of the present invention.

In this second embodiment, there will be described an example of a frequency direction filter that substitutes a transmission line characteristics estimation value for another when a difference between two transmission line characteristics estimation values of mutually adjacent sub-carriers is over a predetermined threshold value. FIG. 19 shows a configuration example of a frequency direction filter 204b in this second embodiment of the present invention. In this embodiment, it is premised in the subject system that the receiver is not notified that a sub-carrier being processed is not a null sub-carrier and it is known that a sub-carrier being processed in the receiver is a null sub-carrier.

In this embodiment, therefore, the receiver cannot know which of sub-carriers is a tone-nulled one. Consequently, in this embodiment, the receiver determines which of sub-carriers is a tone nulled one from powers of consecutive transmission line characteristics estimation values. The power of a transmission line characteristics estimation value is calculated with use of a transmission line characteristics estimation value. In this embodiment, the determination units 307a and 308a shown in FIG. 12 are substituted for a determination unit 307b having a null sub-carrier determination device 311 and a determination unit 308b having a null sub-carrier determination device 312. This is only a difference from the configuration of the frequency direction filter 204a in the first embodiment shown in FIG. 12.

Each of the null sub-carrier determination devices 311 and 312 outputs the transmission line characteristics estimation value of an adjacent sub-carrier to its corresponding one of the switching units 301 and 302 if a difference between the powers of such two transmission line characteristics estimation values is over a predetermined threshold value, that is, the power of the transmission line characteristics estimation value of a sub-carrier adjacent to the given sub-carrier is under a predetermined threshold value and smaller than the power of the transmission line characteristics estimation value of the given sub-carrier.

Next, there will be described the operation of the frequency direction filter 204b in this embodiment with reference to FIG. 19. The null sub-carrier determination unit 311 inputs H(k) and H(k−1) to find the power of a transmission line characteristics estimation value and determines whether or not the k-th sub-carrier is a null sub-carrier having the transmission line characteristics estimation value H(k) according to the ratio between the two power values, then outputs the result signal to the switching unit 301. The null sub-carrier determination unit 312 inputs H(k−2) and H(k−1) to find the power of a transmission line characteristics estimation value and determines whether or not the k-2nd sub-carrier is a null sub-carrier having the transmission line characteristics estimation value H(k−2) according to the ratio between the two power values, then outputs the result signal to the switching unit 302.

The above operation is represented as follows in equations. If the inputted H(k) power is assumed to be P(k) and the H(k−1) power is assumed to be P(k−1) in the null sub-carrier determination unit 311, the ratio between the two powers is represented as P(k−1)/P(k). If the null sub-carrier determination unit 311 is provided with a null sub-carrier threshold value (hereinafter, to be described as TH) used to determine a null sub-carrier according to a power difference between the transmission line characteristics estimation values between mutually adjacent sub-carriers in itself, the output of the null sub-carrier determination unit 311 is represented as follows.

If P(k−1)/P(k)>TH is satisfied, the null sub-carrier determination unit 311 outputs a signal denoting that H(k) is a transmission line characteristics estimation value of a null sub-carrier. If P(k−1)/P(k)≦TH is satisfied, the null sub-carrier determination unit 311 outputs a signal denoting that H(k) is not a transmission line characteristics estimation value of a null sub-carrier. Here, TH is a criterion (threshold value) for determining whether or not the k-th sub-carrier is a null sub-carrier according to the ratio between two power values. If the threshold value is over TH, the sub-carrier is determined as a null sub-carrier. This value is a constant determined by simulation or evaluation.

The operation of the null sub-carrier determination unit 312 is the same as that of the null sub-carrier determination unit 311 if H(k−1) is substituted for H(k−1) of the null sub-carrier determination unit 311 and the other input H(k−2) is substituted for H(k) of the null sub-carrier determination unit 311.

If H(k) and G(k−1) are assumed as an input and an output of the frequency direction filter 204b respectively, the operations represented by the (equation 2), (equation 5), (equation 6), and (equation 7) are enabled. In any case, k∈[−62, 63] is assumed. However, if the k-1st sub-carrier is a null sub-carrier, G(k−1)=H(k−1) is satisfied.

(1) If P(k−1)/P(k)>TH and P(k−1)/P(k−2)≦TH are satisfied, the operation is the same as that of (equation 5).
(2) If P(k−1)/P(k)≦TH and P(k−1)/P(k−2)>TH are satisfied, the operation is the same as that of (equation 6).
(3) If P(k−1)/P(k)>TH and P(k−1)/P(k−2)>TH are satisfied, the operation is the same as that of (equation 7).
(4) If none of the above (1), (2), and (3) is satisfied, the operation is the same as that of (equation 2).

While it is premised in the system in the first embodiment that the receiver is notified that a sub-carrier being processed is a null sub-carrier or it is known that a sub-carrier being processed in the receiver is a null sub-carrier, it is premised in the system in the second embodiment that the receiver is not notified that a sub-carrier being processed is a null sub-carrier or it is not known that a sub-carrier being processed in the receiver is a null sub-carrier. Consequently, the receiver comes to require a function for determining whether or not a sub-carrier being processed is a null sub-carrier.

The determination function in each of the determination units 307b and 308b is required to be improved in receiving characteristics in the fading process as an effect specific to the second embodiment with respect to such a sub-carrier that is not recognized as a null sub-carrier in the first embodiment, but recognized in this embodiment. In the first embodiment, even when the power of a received sub-carrier is reduced enough in a fading process, ripples are generated in the output RxEQ(k) of the equalizer 20 due to the operation of the frequency direction filter 204a, that is, because the influence of the fading is neglected in the frequency direction filter 204a shown in FIG. 12.

On the other hand, in the second embodiment, even when a sub-carrier power is reduced enough in a fading process, a null sub-carrier is determined according to a power difference between the transmission line characteristics estimation values of mutually adjacent sub-carriers. Thus similarly to the operation with respect to the transmission line characteristics estimation value of a tone-nulled sub-carrier, the null sub-carrier determination unit 311 or 312 provided in the receiver determines such a sub-carrier as a null sub-carrier.

As a result of the above determination, a transmission line characteristics estimation value is substituted for another between mutually adjacent sub-carriers, thereby the error of the transmission line characteristics estimation value of a sub-carrier adjacent to a null sub-carrier is improved due to tone nulling in the second embodiment. In addition, when a sub-carrier power is reduced by fading, ripples are generated in the equalizer output RxEQ(k) in the first embodiment. In this embodiment, however, a sub-carrier of which power is reduced is regarded as a null sub-carrier. As a result, the subject transmission line characteristics estimation value is substituted for another to improve the fading-caused error of the transmission line characteristics estimation value of a sub-carrier adjacent to a null sub-carrier. Thus the ripples generated in the equalizer output RxEQ(k) are reduced, thereby the error of the transmission line correction result is improved.

In such a way, in this embodiment, each of the null sub-carrier determination units 311 and 312 determines a null sub-carrier according to a power difference between transmission line characteristics estimation values and substitutes the transmission line characteristics estimation value of a null sub-carrier for the transmission line characteristics estimation value of its adjacent sub-carrier, thereby reducing the transmission line estimation error generated in a smoothing process for transmission line characteristics estimation values between adjacent sub-carriers. Consequently, it is possible to prevent the required CNR from increasing and the communication distance from being shortened due to an increase of the required CNR. And because a null sub-carrier is determined by taking consideration to the influence of fading that has not been neglected in the first embodiment, thereby reducing the error to occur due to a smoothing process of transmission line characteristics estimation values.

In this embodiment, each of the determination units 307 and 308 uses a power of a transmission line characteristics estimation value as described above to determine whether or not a sub-carrier is a null sub-carrier as an example. The determination method is not limited only to that; it is also possible to use a different value calculated according to those transmission line characteristics estimation values to determine whether or not a sub-carrier is a null sub-carrier.

Third Embodiment

Figure 20:
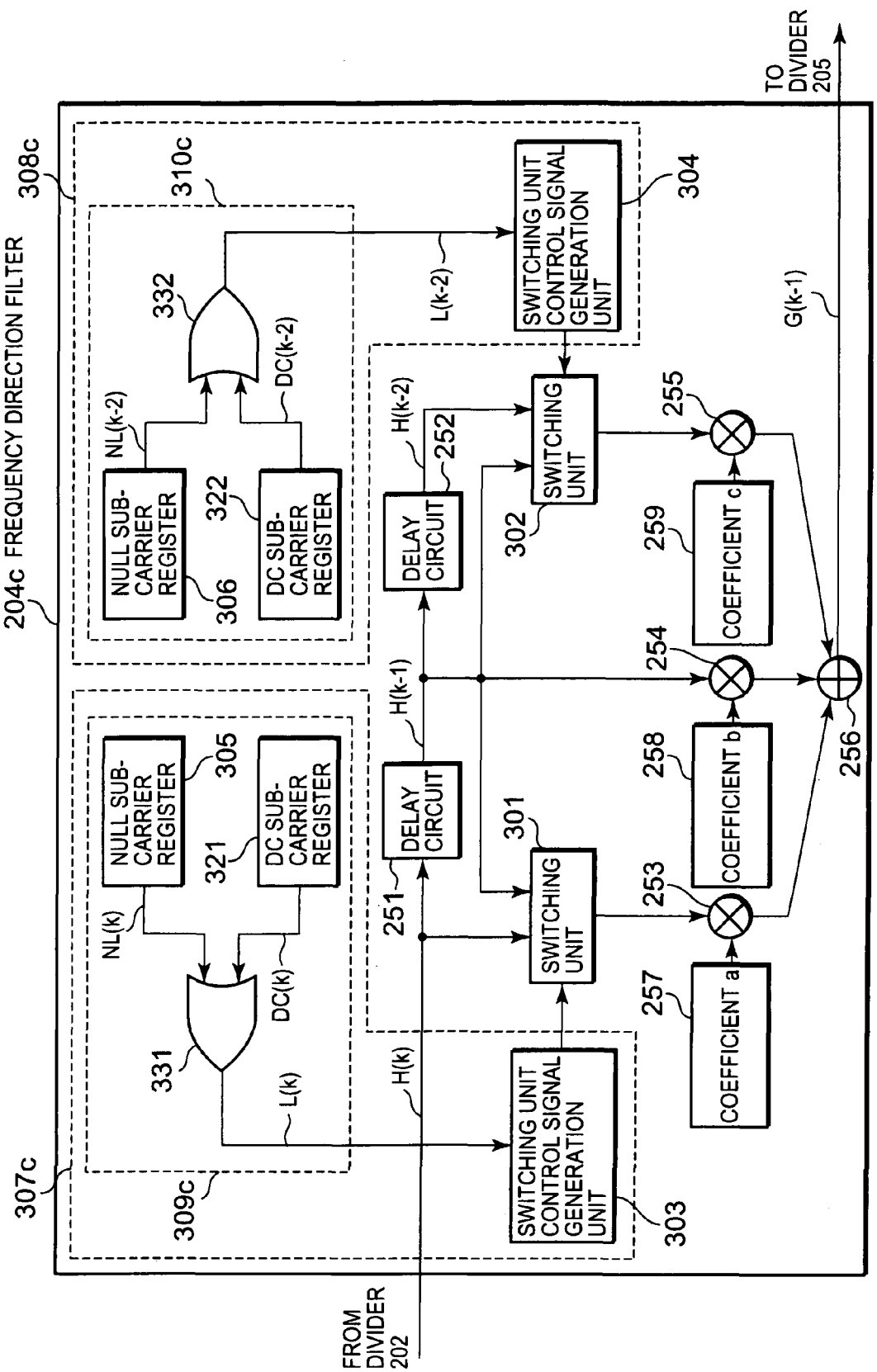
FIG. 20 is a block diagram for showing a configuration example of a frequency direction filter 204c in a third embodiment of the present invention.

In this third embodiment, there will be described an example of a frequency direction filter that determines not only a tone-nulled sub-carrier, but also a DC sub-carrier as a null sub-carrier and substitutes the transmission line characteristics estimation value of a null sub-carriers for another. FIG. 20 shows a configuration example of a frequency direction filter 204c in this third embodiment of the present invention. In FIG. 20, same reference numerals will be used for the same parts of the frequency direction filter 204a shown in FIG. 12 described in the first embodiment, avoiding redundant description. Similarly to the first embodiment, it is premised in the system that the receiver is notified that a sub-carrier being processed is a null sub-carrier or it is known that a sub-carrier being processed in the receiver is a null sub-carrier. This third embodiment is an example that utilizes a fact that the 0-th sub-carrier (DC sub-carrier) is always a null sub-carrier in the OFDM communication.

The frequency direction filter 204c shown in FIG. 20 includes determination units 307c and 308c having memories 309c and 310c obtained by adding DC sub-carrier registers (second registers) 321 and 322 and logical sums (ORs) (logical sum circuits) 331 and 332 to the memories 309a and 310a of the frequency direction filter 204a shown in FIG. 12. Each of the DC sub-carrier registers 321 and 322 makes notification of a DC sub-carrier. The DC sub-carrier registers 321 and 322 retains (k∈[−64, 63] hereinafter, to be described as DC(k)), which takes the same logic as that of the null sub-carrier indicating information shown in FIG. 13 as an example. Each of the DC sub-carrier registers 321 and 322 may be a different storage area just like the null sub-carrier indicating information. Each of the logical sums 331 and 332 calculates a logical sum (OR) with NL(k) or NL(k−2) and with DC(k) or DC(k−2) used in the first embodiment and outputs the calculation result to the control signal generation unit 303 or 304.

Next, there will be described the operation of the frequency direction filter 204c in this embodiment with reference to FIG. 20. In the DC sub-carrier register 321, DC(k)=0 denotes that the k-th sub-carrier is not a DC sub-carrier. As described above, at k=0, DC(k)=1 is assumed. At k=≠0 (k is other than 0), DC(k)=0 is assumed. The output of the DC sub-carrier register 321 is inputted to the logical sum (OR) 331.

The DC sub-carrier register 322 has the same logic as that of the DC sub-carrier register 321. However, the DC sub-carrier register 322 retains DC sub-carrier indicating information with respect to the k-2nd sub-carrier and DC(k−2)=1 is assumed at k−2=0. And in the other case (k−2), DC(k−2)=0 is assumed. The output of the DC sub-carrier register 322 is inputted to the logical sum 332.

The logical sum (OR) 331 inputs NL(k) and DC(k) and outputs a logical sum calculation result (hereinafter, to be described as L(k)) to the control signal generation unit 303. The logical sum (OR) 332 inputs NL(k−2) and DC(k−2) and outputs a logical sum calculation result (hereinafter, to be described as L(k−2)) to the control signal generation unit 304.

The above operations are represented as follows. The output L(k) of the logical sum (OR) 331 and the output L(k−2) of the logical sum (OR) 332 are represented as follows in (equation 8) and (equation 9). "V" denotes a logical sum (OR).

$$L(k) = NL(k) \vee DC(k), k \in [-62, 63] \quad \text{(Equation 8)}$$

$$L(k-2) = NL(k-2) \vee DC(k-2), k \in [-62, 63] \quad \text{(Equation 9)}$$

L(k−1) is found from the result of L(k) calculation. If the input to the frequency direction filter 204c is assumed as H(k) and the output from the frequency direction filter 204c is assumed as G(k−1), the operation becomes as shown in each of (equation 2), (equation 5), (equation 6), and (equation 7). In any of the cases, k∈[−62, 63] is assumed. However, if the k-1st sub-carrier is a null sub-carrier, G(k−1)=H(k−1) is assumed.
(1) If L(k−1)=0 and L(k)=1 are satisfied, the operation is the same as that of (equation 5).
(2) If L(k−1)=0 and L(k−2)=1 are satisfied, the operation is the same as that of (equation 6).
(3) If the above (1) and (2) conditions are satisfied, the operation is the same as that of (equation 7).
(4) If none of the above (1), (2), and (3) conditions is satisfied, the operation is the same as that of (equation 2).

In the third embodiment, the 0-th sub-carrier (DC sub-carrier) is always a null sub-carrier in the OFDM communication and the frequency characteristics are discontinued by DC. Thus it is impossible to include each DC sub-carrier in the calculation of transmission line characteristics estimation values. This is why transmission line characteristics estimation values are substituted as follows. Because it is already known that the 0-th sub-carrier is always a null sub-carrier, the logical sum (OR) between the null sub-carrier register 305 and the DC sub-carrier register 321, and furthermore, the logical sum (OR) between the null sub-carrier register 306 and the DC sub-carrier register 322 are calculated respectively and each calculation result is inputted to the control signal generation units 303 and 304 as null sub-carrier information.

In this third embodiment, therefore, in addition to the improvement of a transmission line correction result with respect to a sub-carrier adjacent to a null sub-carrier in the first embodiment, it is possible to improve the transmission line correction result with respect to a sub-carrier adjacent to a DC sub-carrier.

Fourth Embodiment

Figure 21:
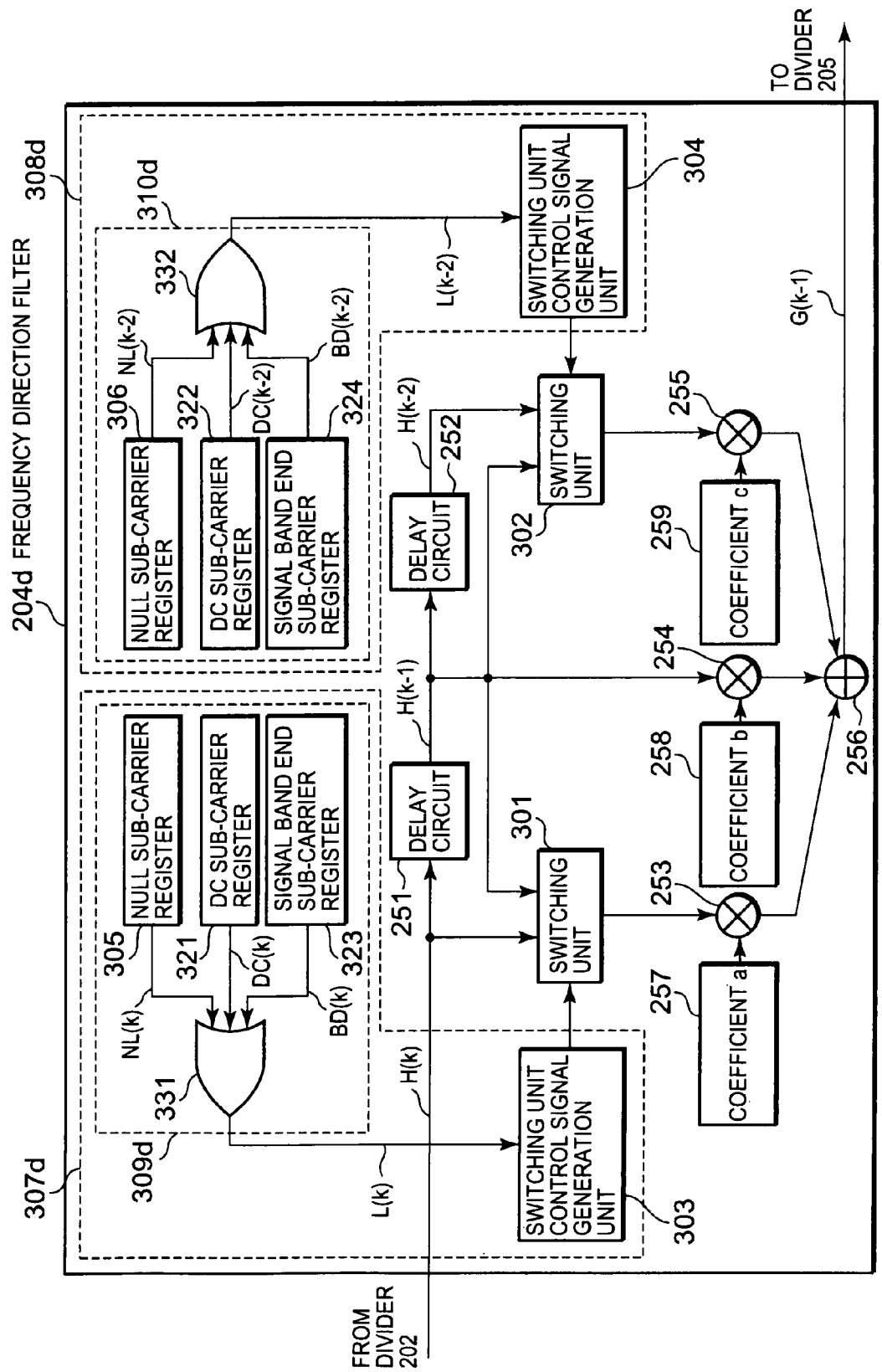
FIG. 21 is a block diagram for showing a configuration example of a frequency direction filter 204d in a fourth embodiment of the present invention.
Figure 22:
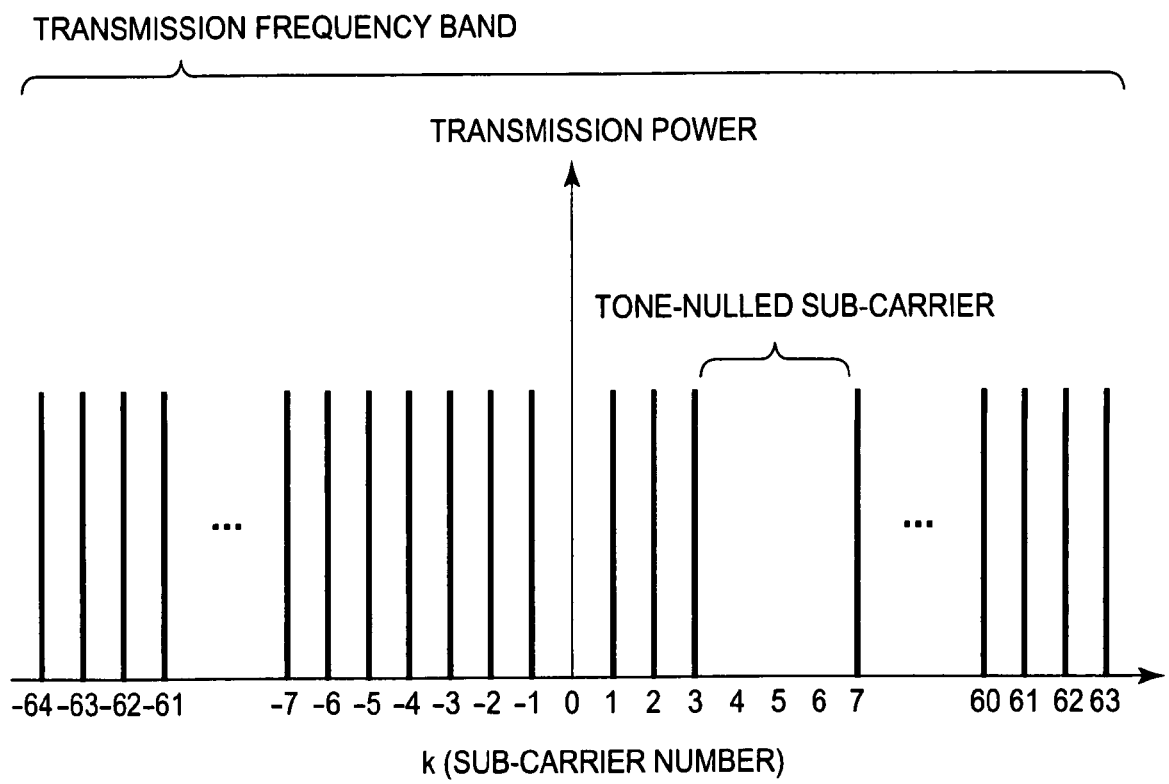
FIG. 22 is a diagram for showing a transmission spectrum when tone-nulling processings are executed for the fourth, fifth, and sixth sub-carriers with use of an interference avoiding technique.

In the fourth embodiment, there will be described a frequency direction filter that determines each of a tone-nulled sub-carrier, a DC sub-carrier, and a sub-carrier at the end of a signal band as a null sub-carrier and makes substitution of its transmission line characteristics estimation value. In other words, the fourth embodiment 4 is an example in which a sub-carrier outside the signal band used for demodulation is regarded as a null sub-carrier. FIG. 21 shows a configuration example of a frequency direction filter 204d in this fourth embodiment of the present invention. In FIG. 21, same reference numerals will be used for the same parts of the frequency direction filter 204c shown in FIG. 20 in the third embodiment, avoiding redundant description. And similarly to the first and third embodiments, it is premised in the system in this fourth embodiment that the receiver is notified that a sub-carrier being processed is a null sub-carrier or it is already known that a sub-carrier being processed in the receiver is a null sub-carrier.

The frequency direction filter 204c shown in FIG. 21 includes determination units 307d and 308d having memories 309d and 310d formed by adding signal band end sub-carrier registers (third registers) 323 and 324 to the memories 309c and 310c of the frequency direction filter 204c shown in FIG. 20. Each of the signal band end sub-carrier registers (third registers) 323 and 324 consists of signal band end sub-carrier indicating information (hereinafter to be described as BD(k), k∈[−64, 63]), which has the same logic as that of the null sub-carrier indicating information shown in FIG. 13 as an example. Similarly to the null sub-carrier indicating information, each of the signal band end sub-carrier registers (third registers) 323 and 324 may consist of a different storage area. Each of the logical sums (ORs) 331 and 332 calculates an OR between NL(k) and NL(k−2) in the first embodiment, an OR between DC(k) and DC(k−2), and an OR between BD(k) and BD(k−2) in the third embodiment, then outputs the calculation result to the control signal generation unit 303 or 304.

Next, there will be described the operation of the frequency direction filter 204 in the fourth embodiment with reference to FIG. 21. BD(k)=1 in the signal band end sub-carrier register (third register) 323 denotes that the k-th sub-carrier is a signal band end null sub-carrier and BD(k)=0 denotes that the k-th sub-carrier is a sub-carrier in the subject signal band. The output of the signal band end sub-carrier register (third register) 323 is inputted to the logical sum (OR) 331.

The signal band end sub-carrier register (third register) 324 has the same logic as that of the signal band end sub-carrier register (third register) 323. However, the signal band end sub-carrier register (third register) 324 has signal band end sub-carrier indicating information for the k-2nd sub-carrier and BD(k−2)=1 denotes that the k-2nd sub-carrier is a null sub-carrier out of the signal band and BD(k−2)=0 denotes that the k-2nd sub-carrier is a sub-carrier in the signal band. The output of the signal band end sub-carrier register (third register) 324 is connected to the logical sum (OR) 332.

The logical sum (OR) 331 inputs NL(k), DC(k), and BD(k) and outputs the result L(k) of each OR calculation to the control signal generation unit 303. The logical sum (OR) 332 inputs NL(k−2), DC(k−2), and BD(k−2) and outputs the result L(k−2) of each OR calculation to the control signal generation unit 303.

The above operations are represented as follows in equations. The output L(k) of the logical sum (OR) 331 and the output L(k−2) of the logical sum (OR) are represented as follows in (equation 10) and (equation 11).

$$L(k)=NL(k) \vee DC(k) \vee BD(k), k\epsilon[-62, 63] \quad \text{(Equation 10)}$$

$$L(k-2)=NL(k-2) \vee DC(k-2) \vee BD(k-2), k\epsilon[-62, 63] \quad \text{(Equation 11)}$$

If L(k−1) is found from the calculation result of L(k) while the input of the frequency direction filter 204 is assumed to be H(k) and the output is assumed to be G(k−1), the operations become as represented as follows in (equation 2), (equation 5), (equation 6), and (equation 7). In any of the cases, k∈[−62, 63] is assumed. However, if the k-1st sub-carrier is a null sub-carrier, G(k−1)=H(k−1) is satisfied.
(1) If L(k−1)=0 and L(k)=1 are satisfied, the operation is the same as that of (equation 5).
(2) If L(k−1)=0 and L(k−2)=1 are satisfied, the operation is the same as that of (equation 6).
(3) If the conditions (1) and (2) are satisfied simultaneously, the operation is the same as that of (equation 7).
(4) If none of the conditions (1) and (2) is satisfied, the operation is the same as that of (equation 2).

In this embodiment, a sub-carrier out of the signal band is regarded as a null sub-carrier and not used for demodulation. In a calculation for smoothing of a sub-carrier positioned at the end of the signal band, however, a sub-carrier out of the signal band is always a null sub-carrier. Consequently, substitution of transmission line characteristics estimation values is made as follows. The logical sum (OR) among the null sub-carrier register 305, the DC sub-carrier register 321, and the signal band end sub-carrier register 323, and furthermore, the logical sum (OR) among the null sub-carrier register 306, the DC sub-carrier register 322, and the signal band end sub-carrier register 324 are calculated respectively and each calculation result is inputted to the corresponding one of the control signal generation units 303 and 304 as null sub-carrier information.

In the first embodiment, the transmission line correction result is improved for a sub-carrier adjacent to a null sub-carrier and in the third embodiment, the transmission line correction result is further improved for a sub-carrier adjacent to a DC sub-carrier, and furthermore, in the fourth embodiment, the transmission line correction result is still further improved for a sub-carrier adjacent to a sub-carrier at the end of the signal band.

The frequency direction filter 204d shown in FIG. 21 includes null sub-carrier registers 305 and 306, DC sub-carrier registers 321 and 322 is shown. However, the frequency direction filter 204d may also be configured so as to include only either the null sub-carrier registers 305 and 306 or the DC sub-carrier registers 321 and 322, as well as the signal band end sub-carrier registers (third registers) 323 and 324. The frequency direction filter 204d may also be configured to include only the signal band end sub-carrier registers (third registers) 323 and 324.

Fifth Embodiment

In each of the above embodiments, the frequency direction filter 204 is configured as a 3-order filter. In this fifth embodiment, however, there will be described an example (not shown) in which an n-order filter (n: a positive integer greater than 0) is used to realize each of those above embodiments. In this fifth embodiment, any one of the following methods (A) to (D) is adopted for making substitution of transmission line characteristics estimation values.

(A) Similarly to the first embodiment, if the subject receiver is notified of a sub-carrier (null sub-carrier) number or the receiver already knows the sub-carrier (null sub-carrier) number, the transmission line characteristics estimation value of the null sub-carrier is substituted for another.
(B) Similarly to the second embodiment, if the subject receiver is not notified of a sub-carrier (null sub-carrier) number or the receiver does not know the sub-carrier (null sub-carrier) number, it is determined whether or not the sub-carrier being processed is a null sub-carrier with use of a null sub-carrier determination device and if it is determined as a null sub-carrier, the transmission line characteristics estimation value of the null sub-carrier is substituted for another.
(C) Similarly to the third embodiment, in addition to the substitution of the transmission line characteristics estimation value of a null sub-carrier in the first embodiment, the substitution of the transmission line characteristics estimation value of a DC sub-carrier is also executed by utilizing the fact that a DC carrier is always a null sub-carrier.
(D) Similarly to the fourth embodiment, a sub-carrier out of the subject signal band used for demodulation is regarded as a null sub-carrier, and in addition to the transmission line characteristics estimation value substitution method in the third embodiment, substitution of the transmission line characteristics estimation value of a sub-carrier out of the signal band is also executed.

In FIG. 11, the frequency direction filter 204 is configured by n−1 sets of the determination units, n−1 sets of switching units, n sets of multipliers, one adder, n−1 sets of delay circuits, and n−1 sets of coefficients if the n (n: a positive integer) sets of transmission line characteristics estimation values are to be smoothed (with use of an n-order filter).

Next, there will be described the operation of the 5-order frequency direction filter 204 when n=5 is assumed. If H(k) is inputted to the frequency direction filter 204, G(k−2) is output from the frequency direction filter 204, and p is assumed as a coefficient to be multiplied to H(k), q is assumed as a coefficient to be multiplied to H(k−1), r is assumed as a coefficient to be multiplied to H(k−2), s is assumed as a coefficient to be multiplied to H(k−3), and t is assumed as a coefficient to be multiplied to H(k−4) respectively, the operations are enabled as shown in equations (12) to 27). In any of the cases, k∈[−60, 63] is assumed. However, if the k-2nd sub-carrier is a null sub-carrier, G(k−2)=H(k−2) is satisfied.

(1) If all of the k-th, k-1st, k-3rd, and k-4th sub-carriers are not null sub-carriers;

$$G(k-2)=pxH(k)+qxH(k-1)+rxH(k-2)+sxH(k-3)+txH(k-4) \quad \text{(Equation 12)}$$

(2) If the k-th sub-carrier is a null sub-carrier;

$$G(k-2)=(p+q)xH(k-1)+rxH(k-2)+sxH(k-3)+txH(k-4) \quad \text{(Equation 13)}$$

(3) If the k-1st sub-carrier is a null sub-carrier;

$$G(k-2)=pxH(k)+(q+r)xH(k-2)+sxH(k-3)+txH(k-4) \quad \text{(Equation 14)}$$

(4) If the k-3rd sub-carrier is a null sub-carrier;

$$G(k-2)=pxH(k)+qxH(k-1)+(r+s)xH(k-2)+txH(k-4) \quad \text{(Equation 15)}$$

(5) If the k-4th sub-carrier is a null sub-carrier;

$$G(k-2)=pxH(k)+qxH(k-1)+rxH(k-2)+(s+t)xH(k-3) \quad \text{(Equation 16)}$$

(6) If the k-th and the k-1st sub-carriers are null sub-carriers;

$$G(k-2)=(p+q+r)xH(k-2)+sxH(k-3)+txH(k-4) \quad \text{(Equation 17)}$$

(7) If the k-th and the k-3rd sub-carriers are null sub-carriers;

$$G(k-2)=(p+q)xH(k-1)+(r+s)xH(k-2)+txH(k-4) \quad \text{(Equation 18)}$$

(8) If the k-th and the k-4th sub-carriers are null sub-carriers;

$$G(k-2)=(p+q)xH(k-1)+rxH(k-2)+(s+t)xH(k-3) \quad \text{(Equation 19)}$$

(9) If the k-1st and the k-3rd sub-carriers are null sub-carriers;

$$G(k-2)=pxH(k)+(q+r+s)xH(k-2)+txH(k-4) \quad \text{(Equation 20)}$$

(10) If the k-1st and the k-4th sub-carriers are null sub-carriers;

$$G(k-2)=pxH(k)+(q+r)xH(k-2)+(s+t)xH(k-3) \quad \text{(Equation 21)}$$

(11) If the k-3rd and the k-4th sub-carriers are null sub-carriers;

$$G(k-2)=pxH(k)+qxH(k-1)+(r+s+t)xH(k-2) \quad \text{(Equation 22)}$$

(12) If the k-th, the k-1st and the k-3rd sub-carriers are null sub-carriers;

$$G(k-2)=(p+q+r+s)xH(k-2)+txH(k-4) \quad \text{(Equation 23)}$$

(13) If the k-th, the k-1st, and the k-4th sub-carriers are null sub-carriers;

$$G(k-2)=(p+q+r)xH(k-2)+(s+t)xH(k-3) \quad \text{(Equation 24)}$$

(14) If the k-th, the k-3rd, ad the k-4th sub-carriers are null sub-carriers;

$$G(k-2)=(p+q)xH(k-1)+(r+s+t)xH(k-2) \quad \text{(Equation 25)}$$

(15) If the k-1st, the k-3rd, ad the k-4th sub-carriers are null sub-carriers;

$$G(k-2)=pxH(k)+(q+r+s+t)xH(k-2) \quad \text{(Equation 26)}$$

(16) If the k-th, the k-1st, the k-3rd, and the k-4th sub-carriers are null sub-carriers;

$$G(k-2)=(p+q+r+s+t)xH(k-2) \quad \text{(Equation 27)}$$

In each of the above embodiments, only a 3-order filter is used. In this fifth embodiment, however, the present invention will use an n-order filter and as such an example, the filter operation at n=5 will be described. And in this fifth embodiment, the number of frequency direction filters 204 can be flexibly changed appropriately to the object system. In this fifth embodiment, therefore, there will be described an example in which each of the determination units 307 and 308 determines whether or not all the consecutive n sets of sub-carriers beginning at and including a target sub-carrier (the k-2nd sub-carrier in the above description) are null sub-carriers and substitutes the transmission line characteristics estimation value of each sub-carrier determined as a null sub-carrier for the transmission line characteristics estimation value of a sub-carrier determined not as a null sub-carrier among the n sets of sub-carriers (including the target sub-carrier), thereby smoothing the transmission line characteristics estimation value. Consequently, it is possible to smooth the transmission line characteristics estimation value of each sub-carrier including a sub-carrier (a next adjacent sub-carrier) adjacent to a sub-carrier adjacent to the target sub-carrier to be processed. It is also possible to include a sub-carrier adjacent to the next adjacent sub-carrier (a sub-carrier after the next adjacent sub-carrier) among the n sets of sub-carriers and to execute a smoothing processing for a plurality of consecutive sub-carriers beginning at the target sub-carrier to be processed.

As a concrete operation in the n=5 case, if only the next adjacent sub-carrier is regarded as a null sub-carrier, the transmission line characteristics estimation value of the next adjacent sub-carrier is substituted for the transmission line characteristics estimation value of its adjacent sub-carrier. If only the adjacent sub-carrier is regarded as a null sub-carrier, the transmission line characteristics estimation value of the adjacent sub-carrier is substituted for the transmission line characteristics estimation value of the target sub-carrier to be processed. If both the next adjacent sub-carrier and the sub-carrier after the next adjacent sub-carrier are regarded as null sub-carriers, the transmission line characteristics estimation value of each of those sub-carriers is substituted for the transmission line characteristics estimation value of the target sub-carrier. And if it is determined that there is no null sub-carrier, no substitution is made. In the above description, the target sub-carrier to be processed is disposed in the center of the n sets of consecutive sub-carriers, but the disposition is not limited only to that example; the disposition of the target sub-carrier may be biased to either side to apply the present invention.

In each of the above embodiments, the frequency direction filter 204 is configured by hardware. However, it may also be configured by software. In this case, the equations from (1) to (27) described above are realized by programs. For example, a program will be executed by a computer for executing processings of receiving a transmission line estimation sequence, generating a transmission line estimation value for each of a plurality of sub-carriers, and smoothing the transmission line estimation value of a target sub-carrier to be processed and the transmission line estimation value of its adjacent sub-carrier. And the program will include at least a procedure for determining whether or not the adjacent sub-carrier is a null sub-carrier and a procedure for smoothing the transmission line estimation value of the target sub-carrier by excluding the transmission line estimation value of the adjacent sub-carrier determined as a null sub-carrier by the determination unit. Concretely, the smoothing procedure makes the computer execute the equation described in each of the above embodiments according to the result of the determining procedure. The program is loaded in a memory of the computer and executed under the control of the CPU (Central Processing Unit) of the computer.

Furthermore, in each of the above embodiments, the smoothing unit 390 is described as smoothing means for substituting the transmission line estimation value of a null sub-carrier for the transmission line estimation value of its adjacent sub-carrier, then inputting the substituted value to the multiplier 256, then smoothing the inputted transmission line estimation value. However, the smoothing procedure is not limited only to that; the smoothing unit 390 is not necessarily required to include the switching units 301 and 302. There may be used a means that suppresses an input to the multiplier 256 if any of the determination units 307 and 308 determines a sub-carrier as a null sub-carrier. For example, each of the determination units 307 and 308 may function so as to set 0 for a coefficient or count the transmission line estimation value to be smoothed except for that of each null sub-carrier, thereby executing smoothing. Furthermore, another means may be used to exclude the transmission line estimation value of each null sub-carrier.

As described above, therefore, the preferred embodiments of the present invention will produce the following effects.
1. The transmission line estimation accuracy for a sub-carrier adjacent to a tone-nulled sub-carrier is improved.
2. The transmission line estimation accuracy for a sub-carrier having a large power and adjacent to a sub-carrier having a power fallen in a fading process is improved even when a power difference becomes large between adjacent two sub-carriers under the influence of fading.
3. The required CNR is improved due to the improvement of the transmission line estimation accuracy in the above items 1 and 2, thereby the communication distance is extended.

4. In each of the embodiments for solving conventional problems as described above, the hardware is less required.

Furthermore, according to the preferred embodiments of the present invention as described above, the following effects are also produced. A correcting means (e.g., any of the retaining circuit 206 and the multiplier 207) for correcting received data with use of a smoothed transmission line estimation value makes it possible to improve the accuracy of the values of the header 402 and the payload 403 (particularly a value assigned to a sub-carrier adjacent to a null sub-carrier).

In each of the above embodiments, an example of a wireless communication apparatus that receives OFDM signals has been described. However, the present invention is not limited only to such a wireless communication apparatus that receives OFDM signals; the present invention can apply to any wireless communication apparatus if it can make communications by assigning data to a plurality of sub-carriers and estimate the transmission line characteristics of each of those sub-carriers according to a transmission line estimation sequence. And while an example of the UWB wireless communication has been described in each of the above embodiments, the present invention can apply even to communications other than the UWB wireless communication as described in the second embodiment if the apparatus can determine a null sub-carrier according to the transmission line characteristics estimation value of each sub-carrier. The wireless communication apparatus can have functions of a communication processing circuit (e.g., the frequency direction filter 402 or the equalizer 20) for smoothing the transmission line characteristics estimation values of a plurality of sub-carriers as needed.

Further, it is noted that, Applicant's intent is to encompass equivalents of all claim elements, even if amended later during prosecution

What is claimed is:

1. A wireless communication apparatus, comprising hardware equalizer which receives a transmission line estimation sequence, and generates a transmission line characteristic estimation value for each of a plurality of sub-carriers, and smoothes a transmission line characteristic estimation value of a target sub-carrier to be processed and the transmission line characteristic estimation value of an adjacent sub-carrier of said plurality of sub-carriers,
wherein said equalizer comprises:
a determination unit which determines whether or not said adjacent sub-carrier comprises a null sub-carrier, and
a smoothing unit which smoothes the transmission line characteristic estimation value of said target sub-carrier by excluding the transmission line characteristic estimation value of said adjacent sub-carrier determined as a null sub-carrier by said determination unit, and
wherein said smoothing unit substitutes the transmission line characteristic estimation value of a sub-carrier determined as a null sub-carrier by said determination unit, for the transmission line characteristic estimation value of said target sub-carrier to execute smoothing in said smoothing unit.

2. The wireless communication apparatus according to claim 1, wherein said determination unit retains sub-carrier information that defines a sub-carrier among said plurality of sub-carriers, to which it is determined not to assign any data beforehand, as a null sub-carrier, and determines whether or not each sub-carrier comprises a null sub-carrier according to said retained sub-carrier information.

3. The wireless communication apparatus according to claim 1, wherein said determination unit compares the transmission line characteristic estimation value of said target sub-carrier with that of said adjacent sub-carrier to determine whether or not a sub-carrier comprises a null sub-carrier.

4. The wireless communication apparatus according to claim 2, wherein said determination unit further retains sub-carrier information that defines a direct current sub-carrier among said plurality of sub-carriers as a null sub-carrier, and determines whether or not a sub-carrier comprises a null sub-carrier according to said retained sub-carrier information.

5. The wireless communication apparatus according to claim 2, wherein said determination unit further retains sub-carrier information that defines a frequency band end sub-carrier among said plurality of sub-carriers as a null sub-carrier, and determines whether or not a sub-carrier comprises a null sub-carrier according to said retained sub-carrier information.

6. The wireless communication apparatus according to claim 1, wherein said determination unit determines whether or not n sets of sub-carriers (n: a positive integer) disposed consecutively from said target sub-carrier including a sub-carrier adjacent to said target sub-carrier and a sub-carrier adjacent to said adjacent sub-carrier comprise all null sub-carriers, and
wherein said smoothing unit substitutes the transmission line characteristic estimation value of a sub-carrier determined as a null sub-carrier by said determination unit for the transmission line characteristic estimation value of any one of said n sets of sub-carriers that are not determined as null sub-carriers, thereby executing smoothing.

7. The wireless communication apparatus according to claim 1, wherein said wireless communication comprises a communication processing circuit.

8. A method of smoothing a transmission line characteristic estimation value of a plurality of sub-carriers, comprising:
identifying whether an adjacent sub-carrier adjacent to a target sub-carrier comprises a null sub-carrier, the adjacent sub-carrier and the target sub-carrier being provided within the plurality of sub-carriers; and
smoothing the transmission line characteristic estimation value of the plurality of sub-carriers without a transmission line characteristic estimation value of the adjacent sub-carrier when the adjacent sub-carrier comprises the null sub-carrier,
wherein said smoothing substitutes the transmission line characteristic estimation value of a sub-carrier identified as a null sub-carrier by said identifying, for the transmission line characteristic estimation value of said target sub-carrier to execute smoothing.

9. A receiver configured to receive a plurality of sub-carriers and to smooth a transmission line characteristic estimation value of the sub-carriers, the receiver comprising:
a determination unit configured to determine whether an adjacent sub-carrier adjacent to a target sub-carrier comprises a null sub-carrier or not, the adjacent and the target sub-carrier being provided within the sub-carriers; and
a smoothing unit configured to smooth the transmission line characteristic estimation value of the sub-carriers without a transmission line characteristic estimation value of the adjacent sub-carrier when the adjacent sub-carrier comprises the null sub-carrier,
wherein said smoothing unit substitutes the transmission line characteristic estimation value of a sub-carrier determined as a null sub-carrier by said determination unit, for the transmission line characteristic estimation value of said target sub-carrier to execute smoothing by said smoothing unit.

10. A receiver according to claim 9, wherein the smoothing unit smoothes the transmission line characteristic estimation value of the sub-carrier with the transmission line characteristic estimation value of the adjacent sub-carrier when the adjacent sub-carrier is not the null sub-carrier.

* * * * *